US012576425B2

(12) United States Patent
Tanaka et al.

(10) Patent No.: US 12,576,425 B2
(45) Date of Patent: Mar. 17, 2026

(54) SUBSTRATE PROCESSING METHOD

(71) Applicant: SCREEN Holdings Co., Ltd., Kyoto (JP)

(72) Inventors: Takayoshi Tanaka, Kyoto (JP); Masayuki Otsuji, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 0 days.

(21) Appl. No.: 18/711,588

(22) PCT Filed: Nov. 4, 2022

(86) PCT No.: PCT/JP2022/041193

§ 371 (c)(1),
(2) Date: May 18, 2024

(87) PCT Pub. No.: WO2023/090171

PCT Pub. Date: May 25, 2023

(65) Prior Publication Data

US 2025/0010330 A1 Jan. 9, 2025

(30) Foreign Application Priority Data

Nov. 22, 2021 (JP) ................................ 2021-189403

(51) Int. Cl.
*B05D 1/36* (2006.01)
*B05D 3/04* (2006.01)
*B05D 5/02* (2006.01)

(52) U.S. Cl.
CPC ............ *B05D 1/36* (2013.01); *B05D 3/0466* (2013.01); *B05D 5/02* (2013.01)

(58) Field of Classification Search
CPC .......... B05D 1/36; B05D 3/0466; B05D 5/02; H01L 21/02082; H01L 21/67028;
(Continued)

(56) References Cited

U.S. PATENT DOCUMENTS

2003/0116837 A1 6/2003 Fukatani et al.
2008/0241512 A1 10/2008 Boris et al.
(Continued)

FOREIGN PATENT DOCUMENTS

JP H08-306087 A 11/1996
JP / 2002 197827 12/2002
(Continued)

OTHER PUBLICATIONS

International Search Report mailed Jan. 17, 2023 in corresponding PCT International Application No. PCT/JP2022/041193.
(Continued)

*Primary Examiner* — James M Mellott
(74) *Attorney, Agent, or Firm* — OSTROLENK FABER LLP

(57) ABSTRACT

In this substrate processing method, a water-repellent treatment is performed on a upper surface of a substrate so as to change the contact angle of pure water with respect to a flat surface to 90° or greater, and then a hydrophobic liquid is supplied to the upper surface of the substrate, thereby replacing a water repellent agent-containing liquid on the upper surface of the substrate with the hydrophobic liquid. After the hydrophobic liquid replacement step, a hydrophilic liquid is supplied to the upper surface of the substrate, thereby replacing the hydrophobic liquid on the upper surface of the substrate with the hydrophilic liquid. After the hydrophilic liquid replacement step, the hydrophilic liquid on the upper surface of the substrate is caused to flow and is removed from the upper surface of the substrate, and the upper surface of the substrate is thereby dried.

4 Claims, 15 Drawing Sheets

(58) Field of Classification Search
CPC ......... H01L 21/67051; H01L 21/67167; H01L 21/02057
See application file for complete search history.

(56) References Cited

U.S. PATENT DOCUMENTS

| | | | | |
|---|---|---|---|---|
| 2008/0248263 | A1 | 10/2008 | Kobrin | |
| 2009/0311874 | A1 | 12/2009 | Tomita et al. | |
| 2010/0075504 | A1 | 3/2010 | Tomita et al. | |
| 2011/0143541 | A1 | 6/2011 | Ogawa et al. | |
| 2013/0196512 | A1* | 8/2013 | Koide | H01L 21/0206 134/105 |
| 2014/0338706 | A1 | 11/2014 | Nonaka | |
| 2015/0279708 | A1 | 10/2015 | Kobayashi et al. | |
| 2016/0291477 | A1 | 10/2016 | Mori et al. | |
| 2017/0043379 | A1 | 2/2017 | Sasaki et al. | |
| 2021/0197224 | A1 | 7/2021 | Abe et al. | |
| 2022/0148888 | A1 | 5/2022 | Kobayashi et al. | |
| 2024/0240051 | A1* | 7/2024 | Ahn | C09D 4/00 |

FOREIGN PATENT DOCUMENTS

| | | | |
|---|---|---|---|
| JP | 2003-197827 | A | 7/2003 |
| JP | 2003-297827 | A | 10/2003 |
| JP | 2010-114414 | A1 | 5/2010 |
| JP | 2011-124410 | A1 | 6/2011 |
| JP | 2013-157480 | A | 8/2013 |
| JP | 2013-214724 | A | 10/2013 |
| JP | 2015-185767 | A | 10/2015 |
| JP | 2016-195230 | A | 11/2016 |
| JP | 2017-038029 | A | 2/2017 |
| JP | 2020-017612 | A | 1/2020 |
| JP | 2020-035961 | A | 3/2020 |
| JP | 2021-141086 | A | 9/2021 |
| TW | 201825197 | A | 7/2018 |

OTHER PUBLICATIONS

Written Opinion mailed Jan. 17, 2023 in corresponding PCT International Application No. PCT/JP2022/041193.
International Preliminary Report on Patentability (Chapter 1) with a Notification from the International Bureau (Form PCT/IB/326) mailed Jun. 6, 2024 in corresponding International Application No. PCT/JP2022/041193.
English translation of the International Preliminary Report on Patentability (Chapter 1) with a Notification from the International Bureau (Form PCT/IB/338) mailed Jun. 6, 2024 in corresponding International Application No. PCT/JP2022/041193.

* cited by examiner

SUBSTRATE PROCESSING METHOD

CROSS-REFERENCE TO RELATED APPLICATIONS

The present application is a 35 U.S.C. §§ 371 national stage application of International Application No. PCT/JP2022/041193 filed Nov. 4, 2022, which claims priority to Japanese Patent Application No. 2021-189403, filed Nov. 22, 2021, the contents of which are incorporated herein by reference.

RELATED APPLICATIONS

This application claims the benefit of priority to Japanese Patent Application No. 2021-189403 filed on Nov. 22, 2021. The entire contents of this application are hereby incorporated herein by reference.

TECHNICAL FIELD

The present invention relates to a substrate processing method that processes a substrate. The substrates to be processed include a semiconductor wafer, a substrate for a FPD (flat panel display) such as a liquid crystal display and an organic EL (electroluminescence) display, a substrate for an optical disc, a substrate for a magnetic disc, a substrate for a magneto-optical disc, a substrate for a photomask, a ceramic substrate, a substrate for a solar cell, and the like, for example.

BACKGROUND ART

In a manufacturing process of a semiconductor or MEMS (Micro Electro Mechanical Systems), in order to prevent the collapse of a micropattern in drying treatment after wet cleaning, a method in which DIW on a substrate is replaced with IPA or the like, and then IPA is vaporized by heating or by decompression has been proposed.

In substrate processing disclosed in FIG. 6 of Patent Literature 1, a pre-drying processing liquid is supplied to a major surface of a substrate on which a pattern is formed, and a solidified film is formed by solidifying the pre-drying processing liquid on the major surface of the substrate, and then the solidified film is sublimated, and, as a result, the major surface of the substrate is dried.

In substrate processing disclosed by Patent Literature 2, a liquid film of IPA is formed on an upper surface of a substrate, and then the substrate is heated in a state in which a hot plate is in contact with the substrate. In this substrate processing, a portion of the liquid film of IPA is vaporized and is brought into a gas-phase state by means of heating, and the interior of a pattern is filled with the gas-phase IPA. The upper surface of the substrate is dried by excluding the liquid film of IPA on vaporized IPA while maintaining a liquid-mass state of the liquid film.

CITATION LIST

Patent Literature

Patent Literature 1: JP 2020017612 A
Patent Literature 2: JP 2015185767 A

SUMMARY OF INVENTION

Technical Problem

In Patent Literature 1, there is a need to sublimate a large amount of solid films, and, in Patent Literature 2, there is a need to evaporate a large amount of IPA. Therefore, in a conventional drying technique, such as that of Patent Literature 1 or that of Patent Literature 2, there is a concern that nonvolatile impurities will remain in a concave portion of a concavo-convex pattern.

An embodiment of the present invention provides a substrate processing method that is capable of reducing impurities remaining in the concave portion of the pattern when the major surface of the substrate on which the pattern is formed is dried.

Solution to Problem

An embodiment of the present invention provides a substrate processing method to process a substrate having a major surface at which a pattern having a concave portion is formed. The substrate processing method includes a water-repellent treatment step of performing a water-repellent treatment on the major surface of the substrate to supply a water repellent agent-containing liquid to the major surface of the substrate and to change a contact angle of pure water with respect to a flat surface to 90° or greater, a hydrophobic liquid replacement step of, after the water-repellent treatment step, supplying a hydrophobic liquid to the major surface of the substrate and replacing the water repellent agent-containing liquid on the major surface of the substrate with the hydrophobic liquid, a hydrophilic liquid replacement step of, after the hydrophobic liquid replacement step, supplying a hydrophilic liquid that is mixable with the hydrophobic liquid and that has hydrophilicity higher than the hydrophobic liquid to the major surface of the substrate and replacing the hydrophobic liquid on the major surface of the substrate with the hydrophilic liquid, and a drying step of, after the hydrophilic liquid replacement step, drying the major surface of the substrate by causing the hydrophilic liquid on the major surface of the substrate to flow and by removing the hydrophilic liquid from the major surface of the substrate. The pure water may be DIW (deionized water).

According to this method, a pattern is formed on the major surface of the substrate, and therefore the major surface of the substrate W is a concave-convex surface.

If the contact angle of pure water with respect to the flat surface is larger than 90°, the contact angle of pure water with respect to the concave-convex surface becomes larger than the contact angle of pure water with respect to the flat surface, and if the contact angle of pure water with respect to the flat surface is smaller than 90°, the contact angle of pure water with respect to the concave-convex surface becomes smaller than the contact angle of pure water with respect to the flat surface.

According to this method, a water-repellent treatment, in which a water repellent agent-containing liquid is supplied to the major surface of the substrate, and, as a result, the contact angle of pure water with respect to the flat surface is changed to 90° or greater, is performed on the major surface of the substrate. Therefore, it is possible to sufficiently raise the contact angle of pure water with respect to the major surface of the substrate. In other words, it is possible to sufficiently raise the hydrophobicity of the major surface of the substrate.

According to this method, the water-repellent treatment is performed on the major surface of the substrate by use of the water repellent agent-containing liquid, and then the water repellent agent-containing liquid is replaced with a hydrophobic liquid. Thereafter, when the hydrophobic liquid is replaced with the hydrophilic liquid, the hydrophobic liquid and the hydrophilic liquid are mixed, and the hydrophilic liquid enters the inside of the concave portion of the pattern. On the other hand, the hydrophobicity of the major surface of the substrate has been sufficiently raised by the water-repellent treatment, and therefore it is possible to cause the hydrophilic liquid to easily flow so that the hydrophilic liquid does not remain on the major surface of the substrate when the hydrophilic liquid is removed from the major surface of the substrate. Therefore, it is possible to sufficiently dry the major surface of the substrate by removing the hydrophilic liquid from the major surface of the substrate by causing the hydrophilic liquid to flow.

As thus described, it is possible to suppress the remaining of the hydrophilic liquid on the major surface of the substrate and to remove the hydrophilic liquid from the major surface of the substrate by causing the hydrophilic liquid to flow. As a result, it is possible to reduce impurities remaining in the concave portion of the pattern.

In an embodiment of the present invention, the hydrophilic liquid replacement step and the drying step are performed without heating liquids on the major surface of the substrate.

Therefore, it is possible to suppress the evaporation of the liquids (the hydrophilic liquid and the hydrophobic liquid, and, mainly, the hydrophilic liquid) on the major surface of the substrate. Therefore, it is possible to suppress the generation of impurities on the major surface of the substrate, particularly inside the concave portion.

In an embodiment of the present invention, the drying step includes a liquid film forming step of forming a liquid film of the hydrophilic liquid on the major surface of the substrate and an enlargement and excluding step of supplying a gas toward the liquid film and forming an opening that exposes the major surface in the liquid film and excluding the hydrophilic liquid from the major surface of the substrate so as to enlarge the opening.

According to this method, it is possible to remove the hydrophilic liquid from the major surface of the substrate by enlarging the opening formed in the liquid film of the hydrophilic liquid. Therefore, it is possible to remove the hydrophilic liquid from the major surface of the substrate while suppressing the evaporation of the hydrophilic liquid. Therefore, it is possible to suppress the generation of impurities in the concave portion of the pattern due to the evaporation of the liquid. As a result, it is possible to reduce impurities remaining in the concave portion of the pattern.

In an embodiment of the present invention, the hydrophobic liquid replacement step includes a hydrophobic liquid filling step of filling the hydrophobic liquid into the concave portion of the pattern. Additionally, the hydrophilic liquid replacement step includes a hydrophilic liquid entry step of allowing the hydrophilic liquid to enter the concave portion while the hydrophilic liquid is mixed with the hydrophobic liquid in the concave portion by allowing the hydrophilic liquid to be supplied to the major surface of the substrate and an internal liquid receding step of causing an internal liquid to recede from the concave portion by causing the internal liquid to flow.

According to this method, the hydrophobic liquid is supplied to the major surface of the substrate after the water-repellent treatment step is performed, and, as a result, it is possible to replace not only the water repellent agent-containing liquid outside the concave portion of the pattern but also the water repellent agent-containing liquid inside the concave portion of the pattern with the hydrophobic liquid. Hence, the hydrophobic liquid enters the concave portion, and the concave portion is filled with the hydrophobic liquid.

Thereafter, when the hydrophobic liquid on the major surface of the substrate is replaced with the hydrophilic liquid, the hydrophobic liquid inside the concave portion of the pattern mixes with the hydrophilic liquid, and the ratio of the hydrophilic liquid contained in a liquid (hereinafter, referred to also as an "internal liquid") inside the concave portion gradually increases. When the ratio of the hydrophilic liquid contained in the internal liquid increases, the hydrophilicity of the internal liquid is raised, and the internal liquid receives a repulsive force from a portion, which defines the concave portion, of the major surface of the substrate. Hence, the internal liquid flows and recedes from the concave portion.

Therefore, it is possible to remove the internal liquid from the concave portion without proactively evaporating the internal liquid, and it is possible to suppress the generation of impurities in the concave portion of the pattern due to the evaporation of the liquid. As a result, it is possible to reduce impurities remaining in the concave portion of the pattern.

In an embodiment of the present invention, the substrate processing method additionally includes a first retreat promoting step of promoting a retreat of the internal liquid from an inside of the concave portion, which is caused by a flow of the internal liquid, by giving external stimulation to the hydrophilic liquid on the major surface of the substrate.

According to this method, the retreat of the internal liquid caused by the flow of the internal liquid is promoted by giving external stimulation to the hydrophilic liquid on the major surface of the substrate. By promoting the retreat of the internal liquid, it is possible to suppress the generation of impurities in the concave portion of the pattern, which is due to the evaporation of a liquid. As a result, it is possible to reduce impurities remaining in the concave portion of the pattern.

The external stimulation is, for example, a physical force that promotes the flow of a hydrophilic liquid on the upper surface of the substrate. The physical force is a shock (kinetic energy). The external stimulation is given to the hydrophilic liquid on the major surface of the substrate by means of supply (spraying) of a gas, supply of a hydrophilic liquid that is in a droplet state, movement of the supply position of a hydrophilic liquid, change in substrate posture, suction of a hydrophilic liquid, or the like.

In an embodiment of the present invention, the substrate processing method additionally includes a second retreat promoting step of promoting a retreat of the internal liquid from an inside of the concave portion, which is caused by a flow of the internal liquid, by replacing the internal liquid with an evolved gas generated from the hydrophilic liquid.

According to this method, the use of the evolved gas produced from the hydrophilic liquid makes it possible to push out the internal liquid from the concave portion more smoothly. Therefore, it is possible to suppress the generation of impurities in the concave portion of the pattern, which is due to the evaporation of a liquid. As a result, it is possible to reduce impurities remaining in the concave portion of the pattern.

In an embodiment of the present invention, the water repellent agent-containing liquid contains 1H,1H,2H,2H-perfluoro decyltriethoxysilane (FDTS). If a water repellent agent-containing liquid that contains FDTS is used, it is easy to perform a water-repellent treatment that changes the contact angle of pure water with respect to the flat surface to 90° or greater, and it is easy to change the contact angle of pure water with respect to the major surface of the substrate to 90° or greater.

The above and other objects, features, and advantages of the present invention will become more apparent from the following detailed description of the embodiments with reference to the attached drawings.

DESCRIPTION OF EMBODIMENTS

Figure 1:
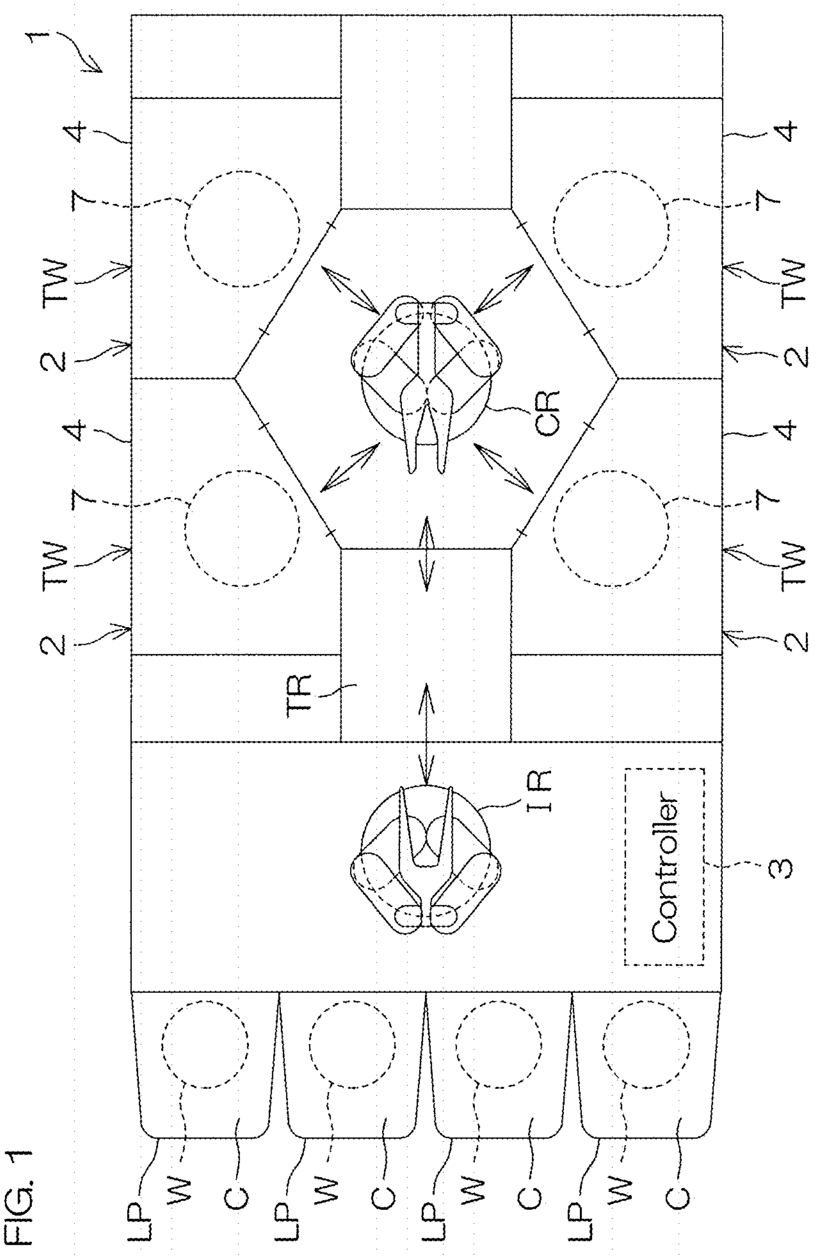
FIG. 1 is an illustrative plan view showing a layout of a substrate processing apparatus according to a first embodiment of the present invention.

Mechanical Configuration of Substrate Processing Apparatus according to First Embodiment FIG. 1 is an illustrative plan view showing a layout of a substrate processing apparatus 1 according to a first embodiment of the present invention.

The substrate processing apparatus 1 includes a plurality of processing units 2 each of which processes a substrate W with a liquid, a load port LP on which a carrier C, which houses the substrates W that are processed by the processing unit 2, is placed, transfer robots IR and CR both of which transfer the substrate W between the load port LP and the processing unit 2, and a controller 3 that controls the substrate processing apparatus 1.

The transfer robot IR transfers the substrate W between the carrier C and the transfer robot CR. The transfer robot CR transfers the substrate W between the transfer robot IR and the processing unit 2. The transfer robots IR and CR are disposed on a transfer path TR that extends from the load ports LP toward the processing units 2.

The processing units 2 each have the same configuration, for example. A chemical liquid, a rinse liquid, a hydrophobic liquid, a water repellent agent-containing liquid, a hydrophilic liquid, etc., are contained in the processing liquids supplied toward the substrate W in the processing unit 2, which will be described in detail later.

The processing units 2 form four processing towers TW respectively disposed at four positions that are at a distance horizontally from each other. Each of the processing towers TW includes a plurality of (for example, three) processing units 2 that are stacked in an up-down direction. The four processing towers TW are disposed on both sides of the transfer path TR two by two.

Each of the processing units 2 includes a processing cup 7 and a chamber 4 housing the processing cup 7. The chamber 4 has an entrance-exit opening (not shown) through which the substrate W is carried in or is carried out by means of the transfer robot CR. The chamber 4 includes a shutter unit (not shown) that opens and closes this entrance-exit opening.

Configuration of Surficial Portion of Major surface of Substrate

Figure 2:
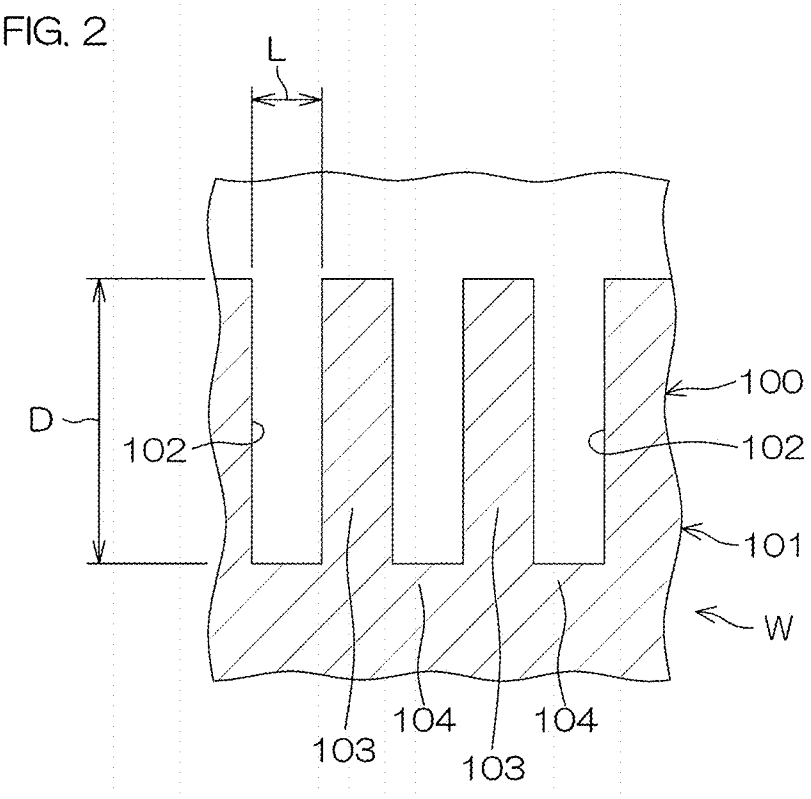
FIG. 2 is a schematic view shown to describe a structure of a surficial portion of a major surface of a substrate that is processed by the substrate processing apparatus.

FIG. 2 is a schematic view shown to describe a structure of a surficial portion of a major surface of the substrate W that is processed by the substrate processing apparatus 1.

The substrate W is a substrate such as a silicon wafer, and has a pair of major surfaces. At least one of the pair of major surfaces is a device surface at which a pattern 100 is formed in a manufacturing process of a device. One of the pair of major surfaces may be a non-device surface at which the pattern 100 is not formed.

The substrate W has a device surface surficial portion 101 in which a plurality of trenches 102 (a plurality of concave portions) are formed. The device surface surficial portion 101 additionally has a fine convex structure 103 (a plurality of convex portions) placed between the trenches 102 adjoining each other and a bottom defining portion 104 that defines a bottom portion of the trench 102. The pattern 100 is composed of the structures 103 and the trenches 102. A surface of the bottom defining portion 104 (a bottom surface of the trench 102) and a surface of the structure 103 compose at least a portion of the major surface of the substrate W.

Unlike FIG. 2, a forward end portion of the structure 103 may have a curved surface although the forward end portion of the structure 103 has a flat surface in FIG. 2. Similarly, unlike FIG. 2, a bottom portion of the trench 102 may have a curved surface although the bottom portion of the trench 102 has a flat surface in FIG. 2.

The device surface surficial portion 101 is, for example, an insulation layer or a semiconductor layer. The semiconductor layer is made of, for example, silicon (Si). The insulation layer may include at least either one of, for example, silicon oxide ($SiO_2$) and silicon nitride (SiN). The device surface surficial portion 101 may have a single layer structure, or may have a layered structure. The layered structure may be made of at least any one of a semiconductor layer, an insulator layer, and a metal layer.

The trench 102 is, for example, linear. A width L of the linear trench 102 denotes the size of the trench 102 in a direction perpendicular to a direction in which the trench 102 extends.

The width L of the trench 102 is, for example, not less than 5 nm and not more than 50 nm. A depth D of the trench 102 is the size of the trench 102, and is, for example, not less than 100 nm and not more than 1500 nm. The trench 102 is not limited to the linear shape. If the trench 102 has a circular shape when seen from a depth direction of the trench 102, the width L corresponds to the diameter of the trench 102.

The depth direction of the trench 102 is, for example, a thickness direction of the substrate W or a direction perpendicular to the thickness direction of the substrate W. If the trench 102 is formed at a planar surface along the thickness direction of the substrate W, the depth direction of the trench 102 is the thickness direction of the substrate W. For example, if a substrate, which is in a process in which an STI (Shallow Trench Isolation) structure or a DTI (Deep Trench Isolation) structure is being formed, is used as the substrate W, the device surface surficial portion 101 is made of an Si layer, and the depth direction of the trench 102 is the thickness direction of the substrate W.

If the trench 102 is formed in a sidewall of another trench formed in the planar surface along the thickness direction of the substrate W, the width direction of the trench 102 is the thickness direction of the substrate W, and the depth direction of the trench 102 is the direction perpendicular to the thickness direction of the substrate W. For example, if a substrate, which is in a process in which a three-dimensional NAND structure is being formed, is used as the substrate W, the device surface surficial portion 101 is made of an $SiO_2$ layer, and the depth direction of the trench 102 is the direction perpendicular to the thickness direction of the substrate W.

Figure 3:
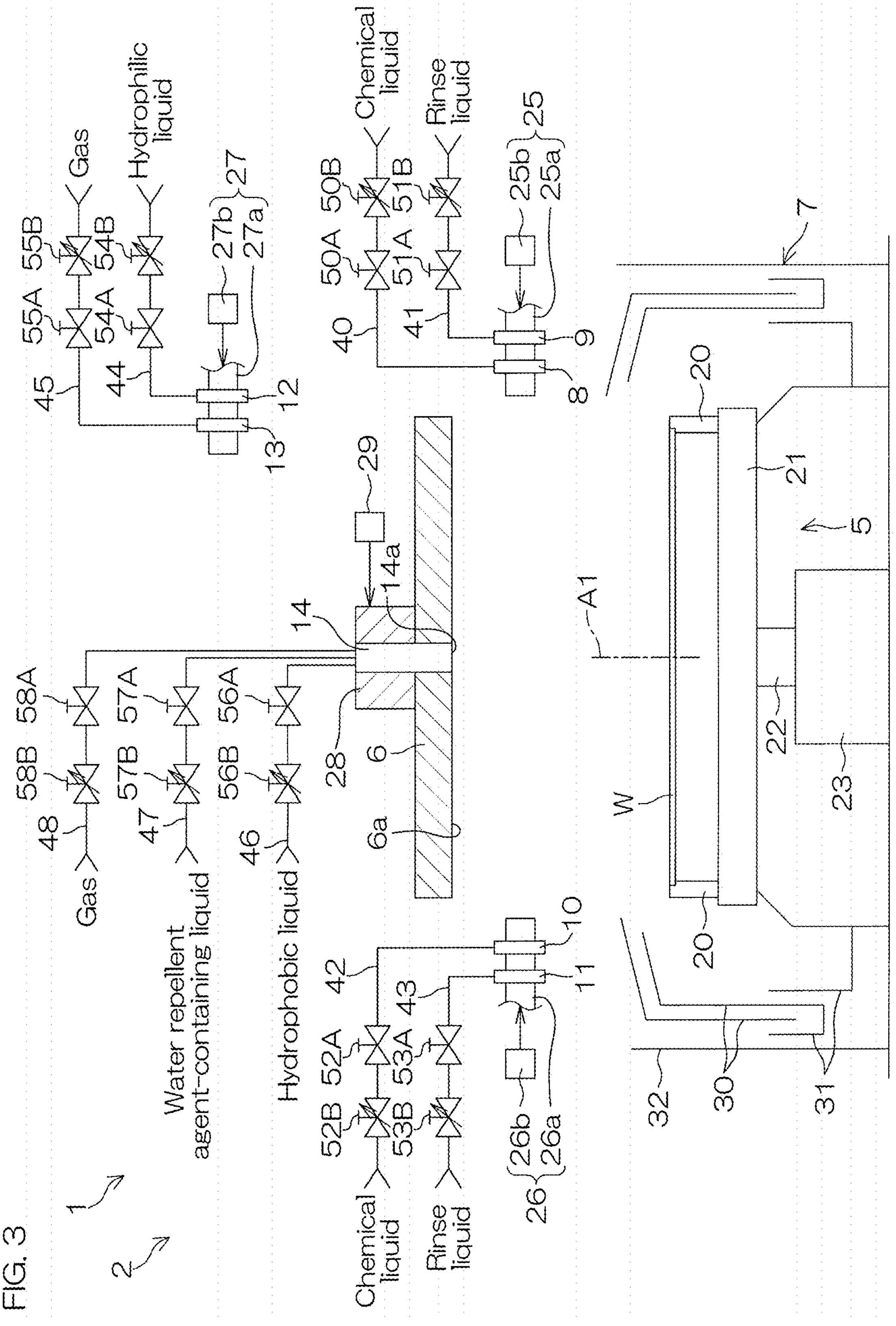
FIG. 3 is a schematic view shown to describe a configuration of a processing unit included in the substrate processing apparatus.

FIG. 3 is a schematic view shown to describe a configuration of the processing unit 2. The processing unit 2 additionally includes a spin chuck 5 that rotates the substrate W around a rotational axis A1 while holding the substrate W in a predetermined processing posture, a facing member 6 having a facing surface 6*a* that faces an upper surface (upper major surface) of the substrate W held by the spin chuck 5 from above, a plurality of fluid nozzles (a first chemical liquid nozzle 8, a first rinse liquid nozzle 9, a second chemical liquid nozzle 10, a second rinse liquid nozzle 11, a hydrophilic liquid nozzle 12, and a gas nozzle 13) each of which supplies a processing liquid to the upper surface of the substrate W, and a central nozzle 14 having a discharge port 14*a* that is exposed from the facing surface 6*a* of the facing member 6 and that faces a central portion of the upper surface of the substrate W. The spin chuck 5, the facing member 6, the fluid nozzles, and the central nozzle 14 are disposed inside the chamber 4 together with the processing cup 7.

The spin chuck 5 holds the substrate W so that the device surface becomes an upper surface. The rotational axis A1 passes through the central portion of the upper surface of the substrate W, and is perpendicular to each major surface of the substrate W held in a processing posture. The processing posture is, for example, a posture of the substrate W shown in FIG. 3, and is a horizontal posture in which the major surface of the substrate W becomes a horizontal surface. If the processing posture is a horizontal posture, the rotational axis A1 vertically extends. The spin chuck 5 is an example of a substrate holding member that holds the substrate W in the processing posture, and is also an example of a rotational holding member that rotates the substrate W around the rotational axis A1 while holding the substrate W in the processing posture.

The spin chuck 5 includes a spin base 21 having a disk shape along a horizontal direction, a plurality of chuck pins 20 that grip the substrate W over the spin base 21 and that grip a peripheral edge portion of the substrate W at a higher position than the spin base 21, a rotational shaft 22 that is connected to the spin base 21 and that extends in a vertical direction, and a rotation driving mechanism 23 that rotates the rotational shaft 22 around its central axis (rotational axis A1). The spin base 21 is an example of the disk-shaped base.

The chuck pins 20 are disposed on an upper surface of the spin base 21 at a distance from each other in a circumferential direction of the spin base 21. For example, the rotation driving mechanism 23 includes an actuator such as an electric motor. The rotation driving mechanism 23 rotates the rotational shaft 22, and, as a result, the spin base 21 and the chuck pins 20 rotate around the rotational axis A1. Hence, the substrate W is rotated around the rotational axis A1 together with the spin base 21 and the chuck pins 20.

The chuck pins 20 are movable between a closed position at which the chuck pins 20 come into contact with the peripheral edge portion of the substrate W and grip the substrate W and an open position at which the chuck pins 20 release the gripping of the substrate W. The chuck pins 20 are moved by an opening-closing mechanism (not shown).

The chuck pins 20 grip the peripheral edge portion of the substrate W and horizontally hold the substrate W when placed at the closed position. The chuck pins 20 release the gripping of the substrate W while supporting the peripheral edge portion of the substrate W from below when placed at the open position. The opening-closing mechanism includes, for example, a link mechanism and an actuator that gives a driving force to the link mechanism.

The facing member 6 is formed in a disk shape whose diameter is substantially equal to or greater than the diameter of the substrate W. A support shaft 28 is fixed on the side opposite to the facing surface 6*a* in the facing member 6.

The facing member 6 is connected to a facing member raising/lowering mechanism 29 that raises and lowers the facing member 6. The facing member raising/lowering mechanism 29 includes, for example, an actuator (not shown), such as an electric motor or an air cylinder, that drives the support shaft 28 in the up-down direction. The facing member 6 may be rotatable around the rotational axis A1.

The facing member 6 is raised or lowered by the facing member raising/lowering mechanism 29 between an upper position that is an upper limit position within a movable range of the facing member 6 and a lower position that is a lower limit position within the movable range of the facing member 6. The facing member 6 is capable of being placed at a distant position at which each fluid nozzle (the first chemical liquid nozzle 8, the first rinse liquid nozzle 9, the second chemical liquid nozzle 10, the second rinse liquid nozzle 11, the hydrophilic liquid nozzle 12, and the gas nozzle 13) can pass through a space between the facing member 6 and the substrate W. The distant position is, for example, the upper position. The facing member 6 is capable of being placed at a shut-off position at which an atmosphere inside a space between the facing member 6 and the upper surface of the substrate W held by the spin chuck 5 is shut off from an atmosphere outside the space. Therefore, the facing member 6 is also referred to as a shut-off plate. The shut-off position is, for example, the lower position.

The processing cup 7 receives a liquid scattering from the substrate W held by the spin chuck 5. The processing cup 7 includes a plurality of (in the example of FIG. 3, two) guards 30 that catch a liquid that scatters outwardly from the substrate W held by the spin chuck 5, a plurality of (in the example of FIG. 3, two) cups 31 that catch a liquid downwardly guided by the guards 30, and a circular cylindrical outer wall member 32 surrounding the guards 30 and the cups 31.

The guards 30 are individually raised or lowered by the guard raising/lowering mechanism (not shown). Each guard 30 is movable to an upper position at which an upper end of the guard 30 is placed at a higher position than the upper surface of the substrate W, and is movable to a lower position at which the upper end of the guard 30 is placed at a lower position than the upper surface of the substrate W, and is movable to an arbitrary position between the upper position and the lower position.

The fluid nozzles include the first chemical liquid nozzle 8 and the second chemical liquid nozzle 10 each of which discharges a chemical liquid toward the upper surface of the substrate W, the first rinse liquid nozzle 9 and the second rinse liquid nozzle 11 each of which discharges a rinse liquid toward the upper surface of the substrate W, the hydrophilic liquid nozzle 12 that discharges a hydrophilic liquid toward the upper surface of the substrate W, and the gas nozzle 13 that discharges a gas toward the upper surface of the substrate W.

The processing unit 2 includes a plurality of nozzle moving mechanisms (a first nozzle moving mechanism 25, a second nozzle moving mechanism 26, and a third nozzle moving mechanism 27) that move a plurality of fluid nozzles at least in the horizontal direction. Each of the nozzle moving mechanisms commonly moves two fluid nozzles. The first nozzle moving mechanism 25 commonly moves the first chemical liquid nozzle 8 and the first rinse liquid nozzle 9. The second nozzle moving mechanism 26 commonly moves the second chemical liquid nozzle 10 and the second rinse liquid nozzle 11. The third nozzle moving mechanism 27 commonly moves the hydrophilic liquid nozzle 12 and the gas nozzle 13.

Each of the nozzle moving mechanisms is capable of moving two corresponding fluid nozzles between a center position and a retreat position. The center position is a position at which the fluid nozzle faces a central region of the upper surface of the substrate W. A central region of the upper surface of the substrate W denotes a region that includes a rotational center (central portion) and a portion around the rotational center in the upper surface of the substrate W. The retreat position is a position at which the fluid nozzle does not face the upper surface of the substrate W, and is a position located outside the processing cup 7.

Each of the nozzle moving mechanisms includes an arm (a first arm 25*a*, a second arm 26*a*, and a third arm 27*a*) that commonly supports two corresponding fluid nozzles and an arm driving mechanism (a first arm driving mechanism 25*b*, a second arm driving mechanism 26*b*, and a third arm driving mechanism 27*b*) that moves a corresponding arm in the horizontal direction. Each of the arm driving mechanisms includes an actuator, such as an electric motor or an air cylinder.

The fluid nozzle may be a turnable nozzle that turns around a predetermined turning axis, or may be a linearly-movable nozzle that linearly moves in a direction in which a corresponding arm extends. The fluid nozzle may be configured to be also movable in the vertical direction.

The first chemical liquid nozzle 8 is connected to a first chemical liquid piping 40 that guides a chemical liquid to the first chemical liquid nozzle 8. The first chemical liquid piping 40 is provided with a first chemical liquid valve 50A that opens and closes the first chemical liquid piping 40 and a first chemical liquid flow rate regulating valve 50B that regulates the flow rate of a chemical liquid in the first chemical liquid piping 40. When the first chemical liquid valve 50A is opened, a continuous flow of a chemical liquid is discharged from the first chemical liquid nozzle 8.

That the first chemical liquid piping 40 is provided with the first chemical liquid valve 50A may mean that the first chemical liquid valve 50A is interposed in the first chemical liquid piping 40. The same applies to other valves described later. The first chemical liquid valve 50A includes a valve body within which a valve seat is provided, a valve element that opens and closes the valve seat, and an actuator that moves the valve element between the open position and the closed position (not shown). The other valves have the same configuration.

The second chemical liquid nozzle 10 is connected to a second chemical liquid piping 42 that guides a chemical liquid to the second chemical liquid nozzle 10. The second chemical liquid piping 42 is provided with a second chemical liquid valve 52A that opens and closes the second chemical liquid piping 42 and a second chemical liquid flow rate regulating valve 52B that regulates the flow rate of a chemical liquid in the second chemical liquid piping 42. When the second chemical liquid valve 52A is opened, a continuous flow of a chemical liquid is discharged from the second chemical liquid nozzle 10.

The chemical liquid discharged from the first chemical liquid nozzle 8 and from the second chemical liquid nozzle 10 is, for example, a liquid that removes residues generated during preprocessing or a liquid that raises the water repellent effect of a water repellent agent-containing liquid described later. The chemical liquid may be a liquid including at least one among, for example, sulfuric acid, acetic acid, nitric acid, hydrochloric acid, hydrofluoric acid, ammonia water, hydrogen peroxide water, organic acid (for example, citric acid, oxalic acid, etc.), organic alkali (for example, TMAH: Tetramethylammonium hydroxide etc.), surfactant, and corrosion inhibitor. An SPM liquid (sulfuric acid/hydrogen peroxide mixture), an APM liquid (ammonia-hydrogen peroxide mixture), etc., can be mentioned as an example of a chemical liquid generated by mixing these liquids.

The first rinse liquid nozzle 9 is connected to a first rinse liquid piping 41 that guides a rinse liquid to the first rinse liquid nozzle 9. The first rinse liquid piping 41 is provided with a first rinse liquid valve 51A that opens and closes the first rinse liquid piping 41 and a first rinse liquid flow rate regulating valve 51B that regulates the flow rate of a rinse liquid in the first rinse liquid piping 41. When the first rinse liquid valve 51A is opened, a continuous flow of a rinse liquid is discharged from the first rinse liquid nozzle 9.

The second rinse liquid nozzle 11 is connected to a second rinse liquid piping 43 that guides a rinse liquid to the second rinse liquid nozzle 11. The second rinse liquid piping 43 is provided with a second rinse liquid valve 53A that opens and closes the second rinse liquid piping 43 and a second rinse liquid flow rate regulating valve 53B that regulates the flow rate of a rinse liquid in the second rinse liquid piping 43. When the second rinse liquid valve 53A is opened, a continuous flow of a rinse liquid is discharged from the second rinse liquid nozzle 11.

The rinse liquid discharged from the first rinse liquid nozzle 9 and from the second rinse liquid nozzle 11 is a liquid that removes chemical liquids and the like from the upper surface of the substrate W by rinsing the upper surface of the substrate W. The rinse liquid is water, such as DIW. However, the rinse liquid is not limited to DIW. The rinse liquid may be, for example, DIW, carbonated water, electrolyzed ion water, aqueous hydrochloric acid solution of dilute concentration (for example of not less than 1 ppm and not more than 100 ppm), ammonia water of dilute concentration (for example of not less than 1 ppm and not more than 100 ppm), and reduced water (hydrogen water).

The hydrophilic liquid nozzle 12 is connected to a hydrophilic liquid piping 44 that guides a hydrophilic liquid to the hydrophilic liquid nozzle 12. The hydrophilic liquid piping 44 is provided with a hydrophilic liquid valve 54A that opens and closes the hydrophilic liquid piping 44 and a hydrophilic liquid flow rate regulating valve 54B that regulates the flow rate of a hydrophilic liquid in the hydrophilic liquid piping 44. When the hydrophilic liquid valve 54A is opened, a continuous flow of a hydrophilic liquid is discharged from the hydrophilic liquid nozzle 12.

The hydrophilic liquid is a liquid that is higher in hydrophilicity than a hydrophobic liquid described later and that is mixable with the hydrophobic liquid. The hydrophilic liquid is, for example, carbonated water. However, the hydrophilic liquid is not limited to carbonated water. The hydrophilic liquid may be, for example, DIW, electrolyzed ion water, aqueous hydrochloric acid solution of dilute concentration (for example of not less than 1 ppm and not more than 100 ppm), ammonia water of dilute concentration (for example of not less than 1 ppm and not more than 100 ppm), and reduced water (hydrogen water). That is, a liquid that is the same as the rinse liquid is usable as the hydrophilic liquid.

The gas nozzle 13 is connected to a gas piping 45 that guides a gas to the gas nozzle 13. The gas piping 45 is provided with a gas valve 55A that opens and closes the gas piping 45 and a gas-flow regulating valve 55B that regulates the flow rate of a gas in the gas piping 45. When the gas valve 55A is opened, a gas is discharged from the gas nozzle 13.

The gas discharged from the gas nozzle 13 is an inert gas, such as nitrogen gas. The inert gas denotes a gas that is inert with respect to the upper surface of the substrate W. Rare gasses, such as argon, in addition to the nitrogen gas, can be mentioned as an example of the inert gas. The gas is not limited to the inert gas, and may be air.

The central nozzle 14 is housed in the facing member 6 and in the support shaft 28. The central nozzle 14 may include a plurality of tubes and a cylindrical casing that surrounds the tubes. The tubes include a hydrophobic liquid tube that discharges a hydrophobic liquid toward the central region of the upper surface of the substrate W, a water repellent agent-containing liquid tube that discharges a water repellent agent-containing liquid toward the central region of the upper surface of the substrate W, and a gas tube that discharges a gas toward the central region of the upper surface of the substrate W.

The central nozzle 14 is connected to a hydrophobic liquid piping 46 that guides a hydrophobic liquid to the central nozzle 14 (i.e., to the hydrophobic liquid tube of the central nozzle 14), and is connected to a water repellent agent-containing liquid piping 47 that guides a water repellent agent-containing liquid to the central nozzle 14 (i.e., to the water repellent agent-containing liquid tube of the central nozzle 14), and is connected to a central gas piping 48 that guides a gas to the central nozzle 14 (i.e., to the gas tube of the central nozzle 14).

The hydrophobic liquid piping 46 is provided with a hydrophobic liquid valve 56A that opens and closes the hydrophobic liquid piping 46 and a hydrophobic liquid flow rate regulating valve 56B that regulates the flow rate of a hydrophobic liquid in the hydrophobic liquid piping 46. When the hydrophobic liquid valve 56A is opened, a continuous flow of a hydrophobic liquid is discharged from the central nozzle 14.

The water repellent agent-containing liquid piping 47 is provided with a water repellent agent-containing liquid valve 57A that opens and closes the water repellent agent-containing liquid piping 47 and a water repellent agent-containing liquid flow rate regulating valve 57B that regulates the flow rate of a water repellent agent-containing liquid in the water repellent agent-containing liquid piping 47. When the water repellent agent-containing liquid valve 57A is opened, a continuous flow of a water repellent agent-containing liquid is discharged from the central nozzle 14.

The central gas piping 48 is provided with a central gas valve 58A that opens and closes the central gas piping 48 and a central gas-flow regulating valve 58B that regulates the flow rate of a gas in the central gas piping 48. When the central gas valve 58A is opened, a gas is discharged from the central nozzle 14.

The hydrophobic liquid discharged from the central nozzle 14 is a liquid that is mixable with the hydrophilic liquid and that is lower in hydrophilicity (higher in hydrophobicity) than the hydrophilic liquid. The hydrophobic liquid is an organic solvent, such as isopropanol (IPA). The organic solvent contained in the hydrophobic liquid includes at least one among, for example, aliphatic hydrocarbon, aromatic hydrocarbon, ester, alcohol, and ether.

Specifically, the organic solvent contains alcohols such as IPA, ethylene glycol monoalkyl ethers such as ethylene glycol monomethyl ether and ethylene glycol monoethyl ether, ethylene glycol monoalkyl ether acetates such as ethylene glycol monomethyl ether acetate and ethylene glycol monoethyl ether acetate, propylene glycol monoalkyl ethers such as propylene glycol monomethyl ether (PGME) and propylene glycol monoethyl ether (PGEE), propylene glycol monoalkyl ether acetates such as propylene glycol monomethyl ether acetate (PGMEA) and propylene glycol monoethyl ether acetate, lactic acid esters such as methyl lactate and ethyl lactate (EL), aromatic hydrocarbons such as toluene and xylene, ketones such as methyl ethyl ketone, 2-heptanone, and cyclohexanone, amides such as N,N-dimethylacetamide and N-methylpyrrolidone, lactones such as γ-butyrolactone, and the like. These organic solvents can be used by itself or by mixing two or more kinds. Additionally, the hydrophobic liquid may be a mixed liquid consisting of an organic solvent and a rinse liquid.

The water repellent agent-containing liquid discharged from the central nozzle 14 is a liquid used to perform a water-repellent treatment in which the major surface of the substrate W is brought into a water repellent state by modifying the major surface of the substrate W. The use of the water repellent agent-containing liquid makes it possible to perform a water-repellent treatment, in which the contact angle of pure water with respect to a flat surface changes to 90° or greater, on the major surface of the substrate W, which will be described in detail later. The major surface of the substrate W on which the water-repellent treatment has been performed is referred to at times as a water repellent surface. The contact angle of pure water with respect to the major surface, which has been brought into a water repellent state, becomes 90° or greater. A state in which the contact angle of pure water with respect to a certain surface is 90° or greater is referred to as a super-water repellent state. Preferably, the contact angle of pure water with respect to the major surface, which has been brought into a water repellent state, is not less than 115° C. and not more than 120°. The contact angle of a liquid with respect to a certain surface means the contact angle of a liquid when liquid droplets of this liquid are placed on this surface.

The water repellent agent-containing liquid contains a water repellent agent serving as a solute and a solvent that dissolves the water repellent agent. The water repellent agent contained in the water repellent agent-containing liquid includes at least any one among, for example, 1H,1H, 2H,2H-perfluoro decyltriethoxysilane (FDTS), 3-aminopropyltriethoxysilane (APTES), benzyl trichlorosilane (Bn-TS), 11-cyanoundecyl trichlorosilane, 11-iodoundecyl trichlorosilane, 11-bromoundecyl trichlorosilane, 11-chloroundecyl trichlorosilane, and undecyl trichlorosilane (H-UTS). That is, the water repellent agent-containing liquid is, for example, a silylation liquid that contains a silylation agent and a solvent. The silylation agent causes a silylation reaction with a hydroxy group exposed from the major surface of the substrate W, and forms a water repellent monomolecular film.

The solvent contained in the water repellent agent-containing liquid is an organic solvent, such as PGMEA. The organic solvent contained in the water repellent agent-containing liquid includes at least one among, for example, aliphatic hydrocarbon, aromatic hydrocarbon, ester, alcohol, and ether.

Specifically, the organic solvent contains alcohols, such as IPA, ethylene glycol monoalkyl ethers such as ethylene glycol monomethyl ether and ethylene glycol monoethyl ether, ethylene glycol monoalkyl ether acetates such as ethylene glycol monomethyl ether acetate and ethylene glycol monoethyl ether acetate, propylene glycol monoalkyl ethers such as PGME and PGEE, propylene glycol monoalkyl ether acetates such as PGMEA and propylene glycol monoethyl ether acetate, lactic acid esters such as methyl lactate and EL, aromatic hydrocarbons such as toluene and xylene, ketones such as methyl ethyl ketone, 2-heptanone, and cyclohexanone, amides such as N,N-dimethylacetamide and N-methylpyrrolidone, lactones such as γ-butyrolactone, and the like. These organic solvents can be used by itself or by mixing two or more kinds. That is, a liquid that is the same as the hydrophobic liquid can be used as the solvent of the water repellent agent-containing liquid.

Figure 4:
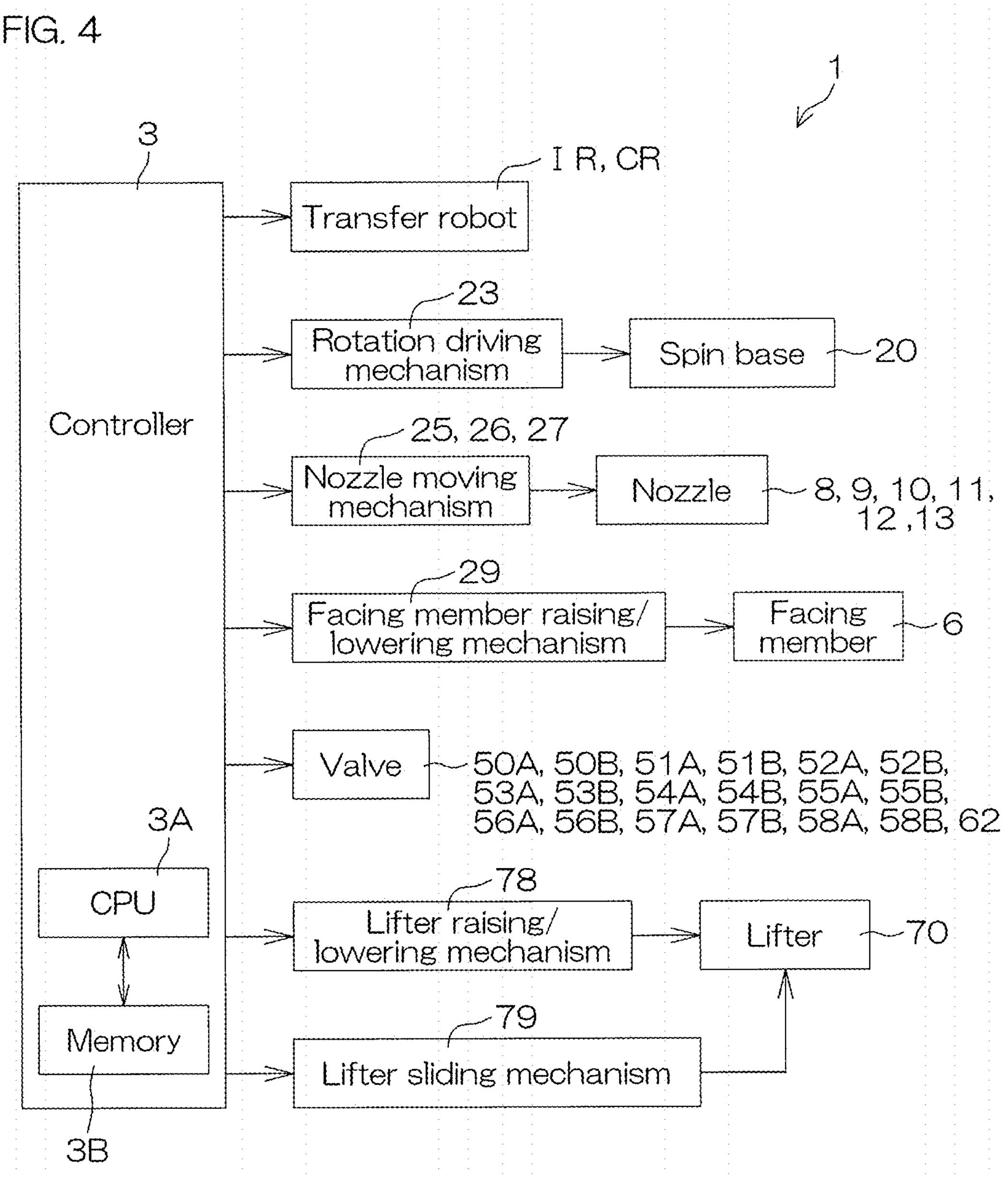
FIG. 4 is a block diagram shown to describe an electrical configuration of the substrate processing apparatus.

Electrical Configuration of Substrate Processing Apparatus According to First Embodiment FIG. 4 is a block diagram shown to describe an electrical configuration of the substrate processing apparatus 1. The controller 3 includes a microcomputer, and controls to-be-controlled components included in the substrate processing apparatus 1 in accordance with a predetermined control program.

Specifically, the controller 3 includes a processor 3A (CPU) and a memory 3B in which a control program is stored. The controller 3 is configured to perform various controls for substrate processing by the processor 3A executing the control program. Particularly, the controller 3 is programmed to control the transfer robots IR and CR, the rotation driving mechanism 23, the first nozzle moving mechanism 25, the second nozzle moving mechanism 26, the third nozzle moving mechanism 27, the facing member raising/lowering mechanism 29, the first chemical liquid valve 50A, the first chemical liquid flow rate regulating valve 50B, the first rinse liquid valve 51A, the first rinse liquid flow rate regulating valve 51B, the second chemical liquid valve 52A, the second chemical liquid flow rate regulating valve 52B, the second rinse liquid valve 53A, the second rinse liquid flow rate regulating valve 53B, the hydrophilic liquid valve 54A, the hydrophilic liquid flow rate regulating valve 54B, the gas valve 55A, the gas-flow regulating valve 55B, the hydrophobic liquid valve 56A, the hydrophobic liquid flow rate regulating valve 56B, the water repellent agent-containing liquid valve 57A, the water repellent agent-containing liquid flow rate regulating valve 57B, the central gas valve 58A, the central gas-flow regulating valve 58B, etc. The presence or absence of the discharge of a fluid from a corresponding nozzle or the discharge flow rate of a fluid from a corresponding nozzle is controlled by the controller 3 controlling the valves.

Additionally, typical members are shown in FIG. 4, and yet this does not mean that members that are not shown are not controlled by the controller 3, but the controller 3 is capable of appropriately controlling each member included in the substrate processing apparatus 1. With respect to FIG. 4, members, which will be hereinafter described in a modification and in a second embodiment, are described together, and these members are also controlled by the controller 3.

Each step shown in FIG. 5 described later is performed by the controller 3 controlling each member included in the substrate processing apparatus 1. In other words, the controller 3 is programmed to perform each step shown in FIG. 5 described later.

Figure 5:
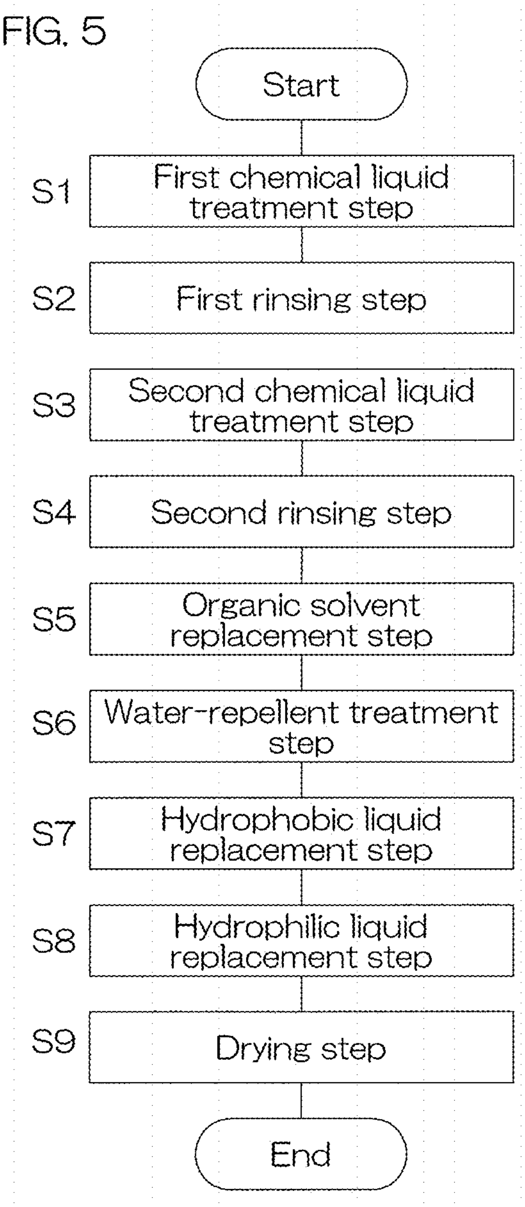
FIG. 5 is a flowchart shown to describe substrate processing performed by the substrate processing apparatus.
Figure 6A:
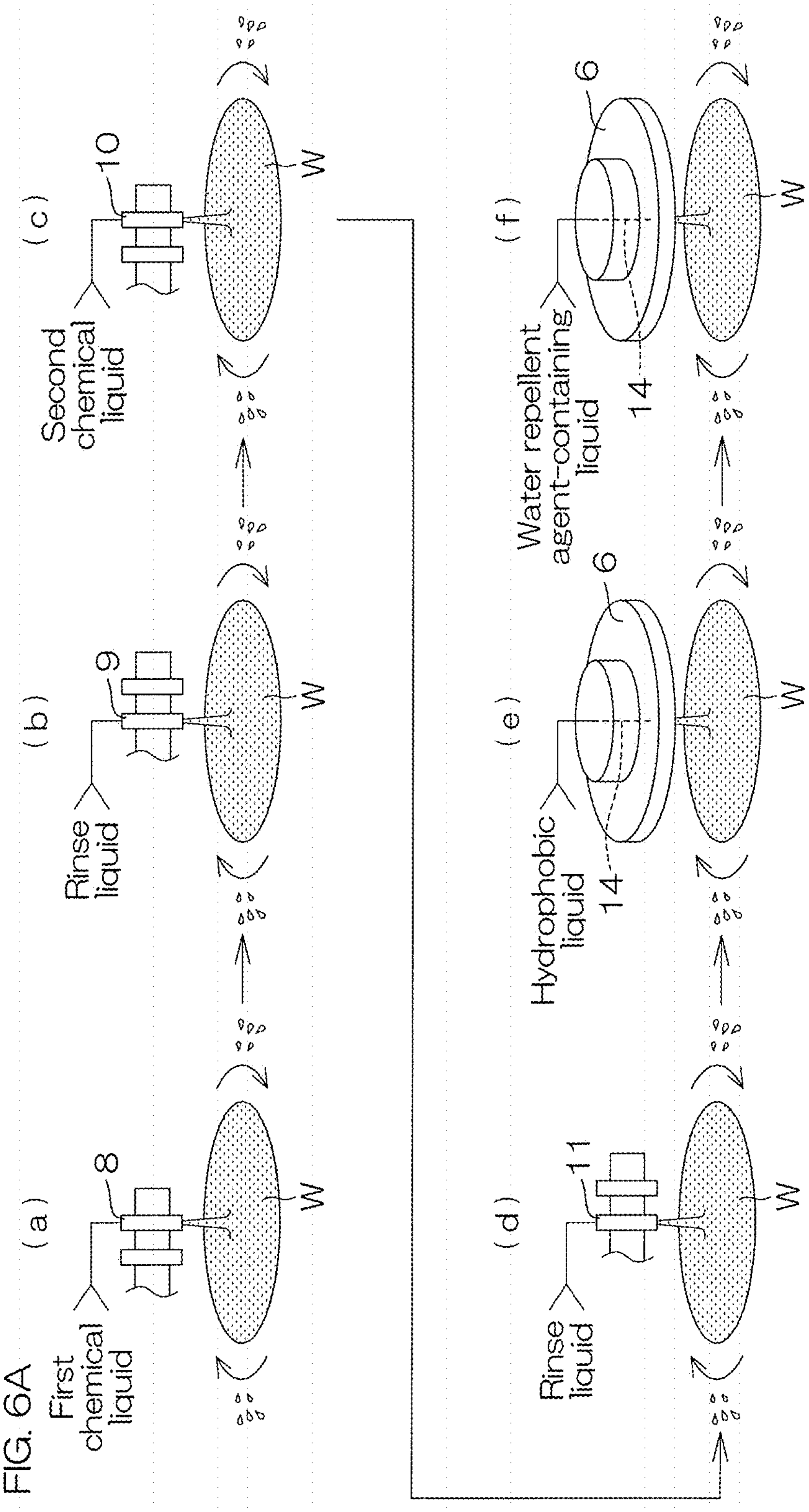
FIG. 6A is a schematic view shown to describe an aspect of an upper surface of the substrate while the substrate processing is being performed.
Figure 6B:
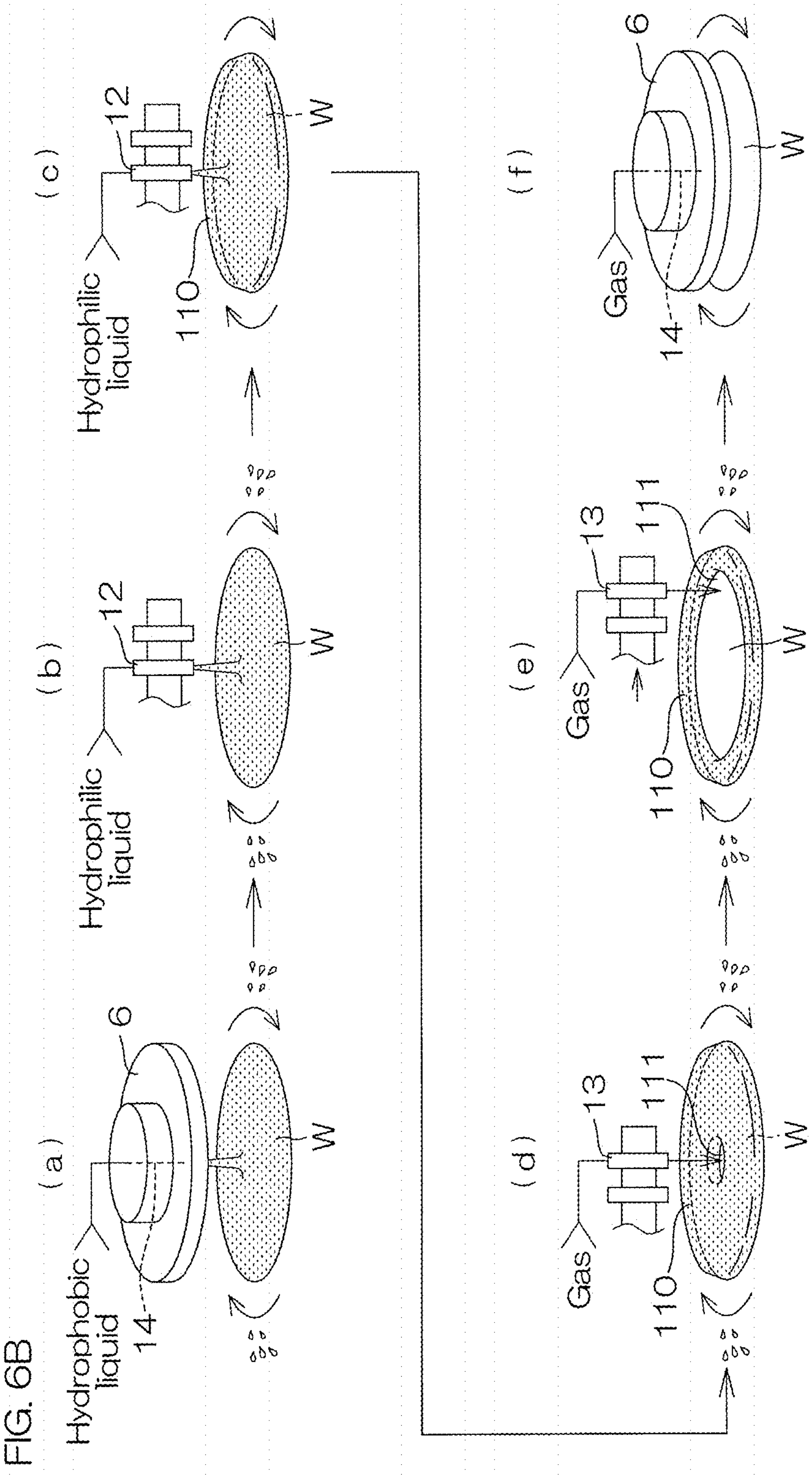
FIG. 6B is a schematic view shown to describe an aspect of the upper surface of the substrate while the substrate processing is being performed.

Example of Substrate Processing Performed by Substrate Processing Apparatus according to First Embodiment FIG. 5 is a flowchart shown to describe an example of substrate processing performed by the substrate processing apparatus 1. FIG. 6A and FIG. 6B are schematic views shown to describe an aspect of the upper surface of the substrate W during substrate processing.

In substrate processing performed by the substrate processing apparatus 1, a first chemical liquid treatment step (step S1), a first rinsing step (step S2), a second chemical liquid treatment step (step S3), a second rinsing step (step S4), an organic solvent replacement step (step S5), a water-repellent treatment step (step S6), a hydrophobic liquid replacement step (step S7), a hydrophilic liquid replacement step (step S8), and a drying step (step S9) are performed as shown in, for example, FIG. 5. The contents of substrate processing will be hereinafter described chiefly with reference to FIG. 3 and FIG. 5. Reference is appropriately made to FIG. 6A and FIG. 6B.

First, a not-yet-processed substrate W is carried into the processing unit 2 from the carrier C by means of the transfer robots IR and CR (see FIG. 1), and is delivered to the spin chuck 5 (substrate carry-in step). Hence, the substrate W is horizontally held by the spin chuck 5 (substrate holding step), and is rotated around the rotational axis A1 (substrate rotating step). In substrate processing, the substrate W is held by the spin chuck 5 so that the device surface becomes an upper surface. The substrate W is continuously held by the spin chuck 5 until the drying step (step S9) is ended.

First, a first chemical liquid treatment step (step S1) is performed in which the upper surface of the substrate W is processed with a chemical liquid (first chemical liquid) such as hydrofluoric acid. Specifically, the first chemical liquid nozzle 8 is moved to a processing position, and the first chemical liquid valve 50A is opened in a state in which the first chemical liquid nozzle 8 is placed at the processing position. Hence, the first chemical liquid is supplied (discharged) from the first chemical liquid nozzle 8 toward the upper surface of the substrate W as shown in FIG. 6A(a) (first chemical liquid discharging step, first chemical liquid supplying step). The discharge flow rate of the first chemical liquid is, for example, 2 L/min. The processing position is, for example, the center position. In this substrate processing, the processing position of each fluid nozzle described later is also the center position except a case in which a description is particularly given.

The first chemical liquid discharged from the first chemical liquid nozzle 8 spreads to the entirety of the upper surface of the substrate W by the centrifugal action caused by the rotation of the substrate W. Hence, the upper surface of the substrate W is processed by the first chemical liquid. Residues generated by preprocessing, such as dry etching, is removed by the first chemical liquid from the upper surface of the substrate W. The substrate W is rotated at, for example, 1000 rpm while the first chemical liquid is being supplied to the upper surface of the substrate W in the first chemical liquid treatment step.

After the first chemical liquid treatment step, the first rinsing step (step S2) in which the upper surface of the substrate W is rinsed by a rinse liquid is performed. Specifically, the first chemical liquid valve 50A is closed, and then the first rinse liquid nozzle 9 is moved to the processing position, and the first rinse liquid valve 51A is opened. Hence, the rinse liquid is supplied (discharged) from the first rinse liquid nozzle 9 toward the upper surface of the substrate W as shown in FIG. 6A(b) (first rinse liquid discharging step, first rinse liquid supplying step). The discharge flow rate of the rinse liquid is, for example, 2 L/min.

The rinse liquid discharged from the first rinse liquid nozzle 9 spreads to the entirety of the upper surface of the substrate W by the centrifugal action caused by the rotation of the substrate W. Hence, the upper surface of the substrate W is washed away, and the first chemical liquid is excluded from the upper surface of the substrate W. The substrate W is rotated at, for example, 1000 rpm while the rinse liquid is being supplied to the upper surface of the substrate W in the first rinsing step.

The rinse liquid is supplied to the upper surface of the substrate W, and then the first rinse liquid valve 51A is closed. Thereafter, the first chemical liquid nozzle 8 and the first rinse liquid nozzle 9 are moved to the retreat position.

Next, the second chemical liquid treatment step (step S3) is performed in which the upper surface of the substrate W is processed by a chemical liquid (second chemical liquid), such as an APM liquid. Specifically, the second chemical liquid nozzle 10 is moved to the processing position, and the second chemical liquid valve 52A is opened in a state in which the second chemical liquid nozzle 10 is placed at the processing position. Hence, the second chemical liquid is supplied (discharged) from the second chemical liquid nozzle 10 toward the upper surface of the substrate W as shown in FIG. 6A(c) (second chemical liquid discharging step, second chemical liquid supplying step). The discharge flow rate of the second chemical liquid is, for example, 2 L/min.

The second chemical liquid discharged from the second chemical liquid nozzle 10 spreads to the entirety of the upper surface of the substrate W by the centrifugal action caused by the rotation of the substrate W. Hence, the upper surface of the substrate W is processed by the second chemical liquid. The upper surface of the substrate W is oxidized by the second chemical liquid, and the water repellent effect of a water repellent agent-containing liquid described later is raised. The substrate W is rotated at, for example, 500 rpm while the second chemical liquid is being supplied to the upper surface of the substrate W in the second chemical liquid treatment step.

After the second chemical liquid treatment step, the second rinsing step (step S4) in which the upper surface of the substrate W is rinsed by a rinse liquid is performed. Specifically, the second chemical liquid valve 52A is closed, and then the second rinse liquid nozzle 11 is moved to the processing position, and the second rinse liquid valve 53A is opened. Hence, the rinse liquid is supplied (discharged) from the second rinse liquid nozzle 11 toward the upper surface of the substrate W as shown in FIG. 6A(d) (second rinse liquid discharging step, second rinse liquid supplying step). The discharge flow rate of the rinse liquid is, for example, 2 L/min.

The rinse liquid discharged from the second rinse liquid nozzle 11 spreads to the entirety of the upper surface of the substrate W by the centrifugal action caused by the rotation of the substrate W. Hence, the upper surface of the substrate W is washed away, and the second chemical liquid is excluded from the upper surface of the substrate W. The substrate W is rotated at, for example, 500 rpm while the rinse liquid is being supplied to the upper surface of the substrate W in the second rinsing step.

The rinse liquid is supplied to the upper surface of the substrate W, and then the second rinse liquid valve 53A is closed. Thereafter, the second chemical liquid nozzle 10 and the second rinse liquid nozzle 11 are moved to the retreat position.

Next, the organic solvent replacement step (step S5) is performed in which a rinse liquid on the upper surface of the substrate W is replaced with a hydrophobic liquid (organic solvent), such as IPA. Specifically, the second chemical liquid nozzle 10 and the second rinse liquid nozzle 11 recede from above the substrate W, and then the facing member 6 is moved to a liquid processing position, and the hydrophobic liquid valve 56A is opened. Hence, a hydrophobic liquid is supplied (discharged) from the central nozzle 14 toward the upper surface of the substrate W as shown in FIG. 6A(e) (organic solvent discharging step, organic solvent supplying step). The discharge flow rate of the hydrophobic liquid is, for example, 0.3 L/min. The liquid processing position is a position between the shut-off position and the distant position.

The hydrophobic liquid discharged from the central nozzle 14 spreads to the entirety of the upper surface of the substrate W by the centrifugal action caused by the rotation of the substrate W. Hence, the hydrophobic liquid is excluded from the upper surface of the substrate W while mixing with the rinse liquid on the upper surface of the substrate W, and the rinse liquid on the upper surface of the substrate W is replaced with the hydrophobic liquid. The substrate W is rotated at, for example, 500 rpm while the hydrophobic liquid is being supplied to the upper surface of the substrate W in the organic solvent replacement step.

Next, the water-repellent treatment step (step S6) is performed in which the upper surface of the substrate W is brought into a water repellent state by the water repellent agent-containing liquid. Specifically, the hydrophobic liquid valve 56A is closed, and, instead, the water repellent agent-containing liquid valve 57A is opened in a state in which the facing member 6 is kept at the liquid processing position. Hence, the water repellent agent-containing liquid is supplied (discharged) from the central nozzle 14 toward the upper surface of the substrate W as shown in FIG. 6A(f) (water repellent agent-containing liquid discharging step, water repellent agent-containing liquid supplying step). The discharge flow rate of the water repellent agent-containing liquid is, for example, 0.3 L/min.

The water repellent agent-containing liquid discharged from the central nozzle 14 spreads to the entirety of the upper surface of the substrate W by the centrifugal action caused by the rotation of the substrate W. Hence, the upper surface of the substrate W is brought into a water repellent state by the water repellent agent-containing liquid. That is, a water-repellent treatment is performed on the upper surface of the substrate W. The substrate W is rotated at, for example, 500 rpm while the water repellent agent-containing liquid is being supplied to the upper surface of the substrate W in the water-repellent treatment step.

Next, the hydrophobic liquid replacement step (step S7) is performed in which the water repellent agent-containing liquid on the upper surface of the substrate W is replaced with a hydrophobic liquid, such as IPA. Specifically, the water repellent agent-containing liquid valve 57A is closed, and, instead, the hydrophobic liquid valve 56A is opened in a state in which the facing member 6 is kept at the liquid processing position. Hence, the hydrophobic liquid is supplied (discharged) from the central nozzle 14 toward the upper surface of the substrate W as shown in FIG. 6B(a) (hydrophobic liquid discharging step, hydrophobic liquid supplying step). The discharge flow rate of the hydrophobic liquid is, for example, 0.3 L/min.

The hydrophobic liquid discharged from the central nozzle 14 spreads to the entirety of the upper surface of the substrate W by the centrifugal action caused by the rotation of the substrate W. Hence, the hydrophobic liquid is excluded from the upper surface of the substrate W while mixing with the water repellent agent-containing liquid on the upper surface of the substrate W, and the water repellent agent-containing liquid on the upper surface of the substrate W is replaced with the hydrophobic liquid. The substrate W is rotated at, for example, 500 rpm while the hydrophobic liquid is being supplied to the upper surface of the substrate W in the hydrophobic liquid replacement step.

Next, the hydrophilic liquid replacement step (step S8) is performed in which the hydrophobic liquid on the upper surface of the substrate W is replaced with a hydrophilic liquid, such as carbonated water. Specifically, the hydrophobic liquid valve 56A is closed, and the facing member 6 is moved to the retreat position. The hydrophilic liquid nozzle 12 is moved to the processing position in a state in which the facing member 6 is placed at the retreat position, and the hydrophilic liquid valve 54A is opened in a state in which the hydrophilic liquid nozzle 12 is placed at the processing position. Hence, the hydrophilic liquid is supplied (discharged) from the hydrophilic liquid nozzle 12 toward the upper surface of the substrate W as shown in FIG. 6B(b) (hydrophilic liquid discharging step, hydrophilic liquid supplying step). The discharge flow rate of the hydrophilic liquid is, for example, 2 L/min.

The hydrophilic liquid discharged from the hydrophilic liquid nozzle 12 spreads to the entirety of the upper surface of the substrate W by the centrifugal action caused by the rotation of the substrate W. Hence, the hydrophilic liquid is excluded from the upper surface of the substrate W while mixing with the hydrophobic liquid on the upper surface of the substrate W, and the hydrophobic liquid on the upper surface of the substrate W is replaced with the hydrophilic liquid. The substrate W is rotated at, for example, 1000 rpm while the hydrophilic liquid is being supplied to the upper surface of the substrate W in the hydrophilic liquid replacement step.

Thereafter, the drying step (step S9) is performed in which the hydrophilic liquid on the upper surface of the substrate W is removed from the upper surface of the substrate W and in which the upper surface of the substrate W is dried.

Specifically, the rotation of the substrate W is decelerated while continuously discharging the hydrophilic liquid from the hydrophilic liquid nozzle 12, and the substrate W is rotated at a rotation speed of, for example, not less than 10 rpm and not more than 50 rpm (rotation decelerating step). Hence, a liquid film 110 of the hydrophilic liquid is formed on the upper surface of the substrate W as shown in FIG. 6B(c) (liquid film forming step).

The liquid film 110 is formed, and then the hydrophilic liquid valve 54A is closed. Thereafter, the gas nozzle 13 is moved to the processing position, and the gas valve 55A is opened. Hence, an opening 111 that exposes the central region of the upper surface of the substrate W is formed in a central region of the liquid film 110 by means of a gas discharged from the gas nozzle 13 as shown in FIG. 6B(d) (opening forming step).

The opening 111 is formed, and then the supply of the gas onto the upper surface of the substrate W and the rotation of the substrate W are continued. The gas sprayed onto the upper surface of the substrate W radially spreads along the upper surface of the substrate W. Hence, the movement of the hydrophilic liquid to a peripheral edge portion of the upper surface of the substrate W is promoted. Additionally, the movement of the hydrophilic liquid to the peripheral edge portion of the upper surface of the substrate W is promoted by a centrifugal force due to the rotation of the substrate W. Therefore, the hydrophilic liquid is excluded from the upper surface of the substrate W by at least either one of the spraying of the gas and the rotation of the substrate W so as to enlarge the opening 111 as shown in FIG. 6B(e) (opening enlarging step, enlargement and excluding step). The discharge flow rate of the gas in the opening forming step and in the opening enlarging step is, for example, 100 L/min. The opening 111 is enlarged until an outer periphery of the opening 111 reaches an outer periphery of the upper surface of the substrate W. The liquid film 110 is finally removed from the upper surface of the substrate W by means of the enlargement of the opening 111, and the upper surface of the substrate W is dried.

Thereafter, the gas valve 55A is closed, and the hydrophilic liquid nozzle 12 and the gas nozzle 13 are moved to the retreat position. The hydrophilic liquid nozzle 12 and the gas nozzle 13 recede, and then the rotation of the substrate W is accelerated, and the substrate W is rotated at a high speed (high-speed rotation step). The substrate W is rotated at, for example, 1500 rpm. In that case, the facing member 6 is placed at a proximal position that is closer to the upper surface of the substrate W than the liquid processing position, and the central gas valve 58A is opened, and a gas is sprayed from the central nozzle 14 onto the upper surface of the substrate W as shown in FIG. 6B(f). Hence, liquid components (chiefly, hydrophilic liquid) that slightly remain on the upper surface of the substrate W and steam in an atmosphere contiguous to the upper surface of the substrate W are removed. The proximal position may be the shut-off position. The discharge flow rate of the gas discharged from the central nozzle 14 is, for example, 150 L/min.

After the drying step (step S9), the facing member 6 is moved to the distant position, and the rotation driving mechanism 23 stops rotating the substrate W. Thereafter, the transfer robot CR enters the processing unit 2, and receives an already-processed substrate W from the spin chuck 5, and carries the substrate W to the outside of the processing unit 2 (substrate carry-out step). The substrate W is delivered from the transfer robot CR to the transfer robot IR, and is housed in the carrier C by the transfer robot IR.

Contact Angle of Pure Water with Respect to Upper Surface of Substrate

Figure 7A:
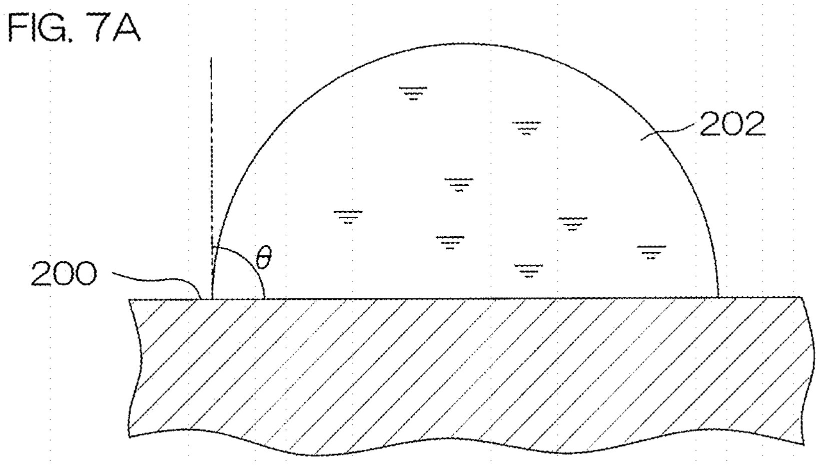
FIG. 7A is a schematic view showing a state in which a liquid droplet of pure water is placed on a flat surface.
Figure 7B:
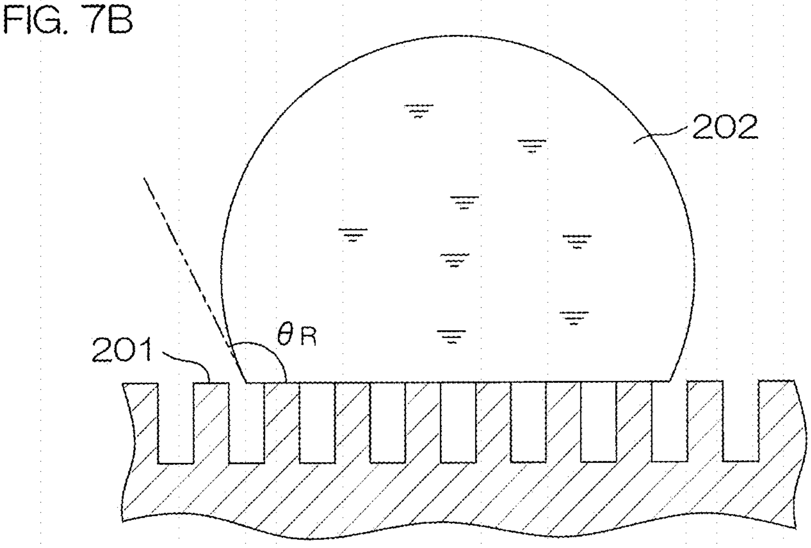
FIG. 7B is a schematic view showing a state in which a liquid droplet of pure water is placed on a concave-convex surface.

The pattern 100 is formed on the upper surface of the substrate W, and therefore the upper surface of the substrate W is a concave-convex surface. FIG. 7A is a schematic view showing a state in which a liquid droplet 202 of pure water is placed on a flat surface 200 that does not have unevenness. FIG. 7B is a schematic view showing a state in which the liquid droplet 202 of pure water is placed on the concave-convex surface 201 that has unevenness. There is a case in which a contact angle $\theta$ of pure water with respect to the flat surface 200 and a contact angle $\theta_R$ of pure water with respect to the concave-convex surface 201 are mutually different as shown in FIG. 7A and FIG. 7B.

Figure 8:
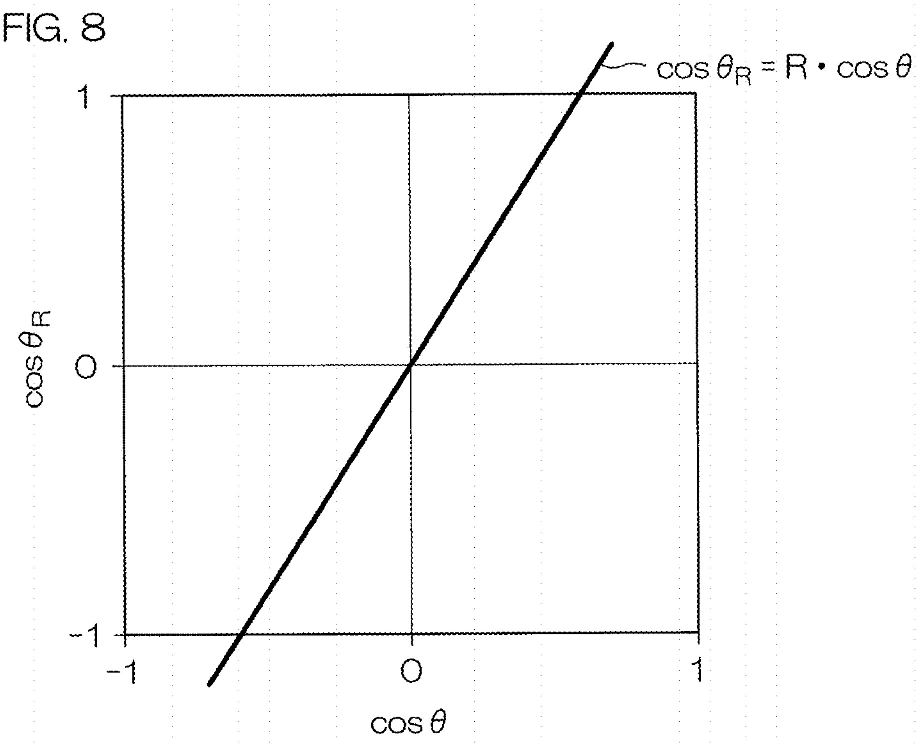
FIG. 8 is a graph shown to describe a relationship between a contact angle of pure water with respect to the flat surface and a contact angle of pure water with respect to the concave-convex surface.

FIG. 8 is a graph shown to describe a relationship between the contact angle $\theta$ of pure water with respect to the flat surface 200 and the contact angle $\theta_R$ of pure water with respect to the concave-convex surface 201. If the surface area of the concave-convex surface 201 is set to be R times (R>1) as large as the surface area of the flat surface 200, the relational expression of "$\cos\theta_R = R\cdot\cos\theta$" is established (Wenzel model) as shown in FIG. 8.

In the above expression, if $\theta<90°$ ($0<\cos\theta<1$), $\theta_R$ becomes smaller than $\theta$ ($\theta_R<\theta$), and, if $\theta>90°$ ($-1<\cos\theta<0$), $\theta_R$ becomes larger than $\theta$ ($\theta_R>\theta$) wherein $\theta=90°$ ($\cos\theta=0$) is defined as a boundary. In other words, if $\theta<90°$, the contact angle $\theta_R$ with respect to the concave-convex surface 201 becomes smaller than the contact angle $\theta$ with respect to the flat surface 200, and the concave-convex surface 201 shows hydrophilicity higher than the flat surface 200. Additionally, if $\theta>90°$, the contact angle $\theta_R$ with respect to the concave-convex surface 201 becomes larger than the contact angle $\theta$ with respect to the flat surface 200, and the concave-convex surface 201 shows hydrophobicity higher than the flat surface 200.

On the supposition that R=2, a comparison between the contact angle $\theta$ and the contact angle $\theta_R$ is hereinafter made by use of concrete numerical values. For example, if the contact angle $\theta$ of pure water with respect to the flat surface 200 is 80° ($\theta=80°$), $\cos\theta$ is about 0.17 ($\cos 80°\approx 0.17$). In this case, $\cos\theta_R$ is 0.34 ($\cos\theta_R=2\times 0.17=0.34$), and $\theta_R$ is about 70°. Therefore, the contact angle $\theta_R$ of pure water with respect to the concave-convex surface 201 becomes about 70°.

If the contact angle $\theta$ of pure water with respect to the flat surface 200 is 100° ($\theta=100°$), $\cos\theta$ is about −0.17 ($\cos 100°\approx -0.17$). In this case, $\cos\theta_R$ is −0.34 ($\cos\theta_R=2\times -0.17=-0.34$), and $\theta_R$ is about 110°. Therefore, the contact angle $\theta_R$ of pure water with respect to the concave-convex surface 201 becomes about 110°.

Therefore, it is possible to sufficiently bring the upper surface of the substrate W into a water repellent state by performing a water-repellent treatment, in which the contact angle $\theta$ of pure water with respect to the flat surface 200 is set to be 90° or greater, on the upper surface of the substrate W. Specifically, it is possible to change the contact angle $\theta$ of pure water with respect to the upper surface of the substrate W to, for example, not less than 115° and not more than 120°.

In the substrate processing mentioned above, a water-repellent treatment in which a water repellent agent-containing liquid is supplied to the upper surface of the substrate W, and, as a result, the contact angle $\theta$ of pure water with respect to the flat surface 200 is changed to 90° or greater, is performed on the upper surface of the substrate W. Therefore, it is possible to sufficiently raise the contact angle of pure water with respect to the upper surface of the substrate W. In other words, it is possible to sufficiently raise the hydrophobicity of the upper surface of the substrate W.

The water-repellent treatment is performed on the upper surface of the substrate W by use of the water repellent agent-containing liquid, and then the water repellent agent-containing liquid is replaced with a hydrophobic liquid. Thereafter, the hydrophobic liquid is replaced with a hydrophilic liquid, thus the hydrophobic liquid and the hydrophilic liquid are mixed, and it is possible for the hydrophilic liquid to enter the inside of the trench 102. On the other hand, the hydrophobicity of the upper surface of the substrate W has been sufficiently raised by the water-repellent treatment, and therefore it is easy to cause the hydrophilic liquid to flow so that the hydrophilic liquid does not remain on the upper surface of the substrate W when the hydrophilic liquid is removed from the upper surface of the substrate W. Therefore, it is possible to sufficiently dry the upper surface of the substrate W by removing the hydrophilic liquid from the upper surface of the substrate W by causing the hydrophilic liquid to flow.

As thus described, it is possible to suppress the remaining of the hydrophilic liquid on the upper surface of the substrate W and to remove the hydrophilic liquid from the upper surface of the substrate W by causing the hydrophilic liquid to flow. As a result, it is possible to reduce impurities remaining in the trench 102.

Aspect of Surficial Portion of Upper Surface of Substrate

Figure 9:
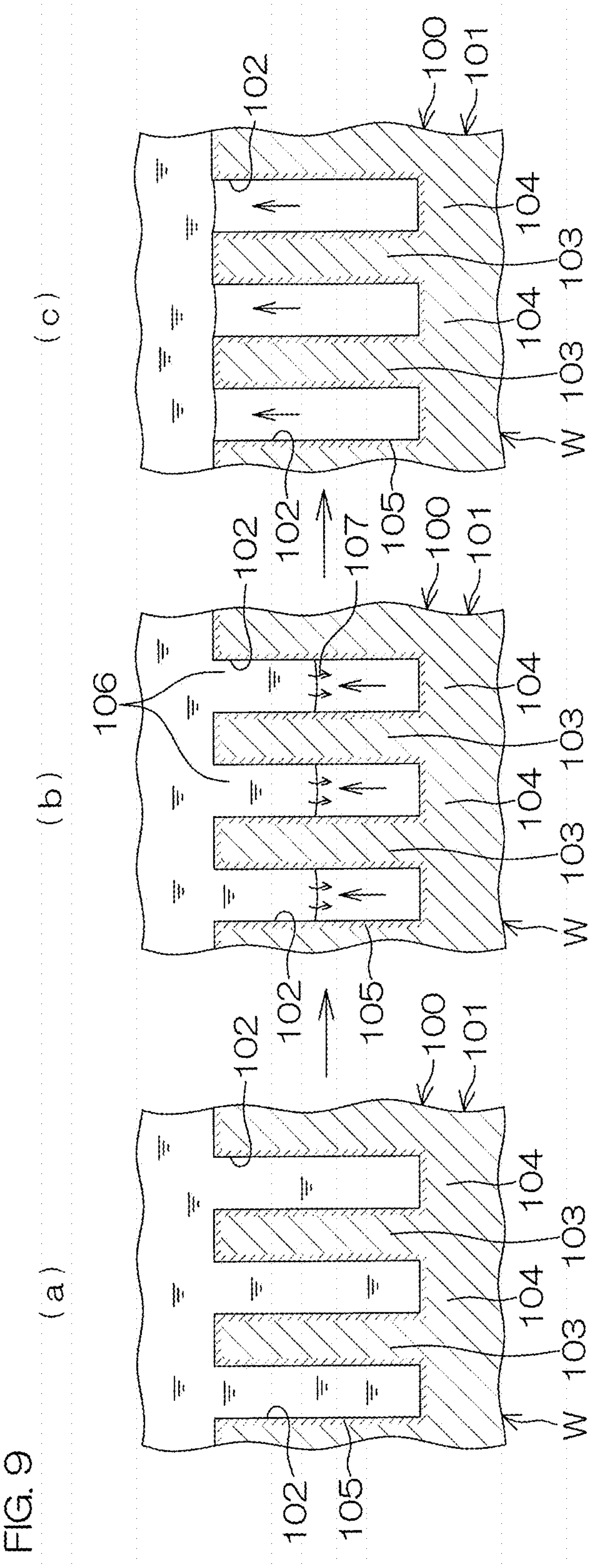
FIG. 9 is a schematic view shown to describe an aspect near the upper surface of the substrate while the substrate processing is being performed.

FIG. 9 is a schematic view shown to describe an aspect near the upper surface of the substrate W during substrate processing. A description will be hereinafter given of an example of a mechanism in which a liquid recedes from the trench 102 in the hydrophobic liquid replacement step (step S7) to the drying step (step S9) shown in FIG. 5. A liquid does not necessarily recede from the trench 102 on the basis of the mechanism described later, and it is merely necessary for a liquid in the trench 102 to flow so that a hydrophilic liquid is removed from the upper surface of the substrate W.

A water repellent agent-containing liquid is supplied to the upper surface of the substrate W in the water-repellent treatment step, and, as a result, the water-repellent treatment that changes the contact angle $\theta$ of pure water with respect to the flat surface 200 to 90° or greater is performed on the upper surface of the substrate W. The water-repellent treatment is performed in the upper surface of the substrate W, and, as a result, a portion, which has been modified (hydrophobized), of the upper surface serves as a water repellent surface 105. A region in which hatching that has narrow intervals is drawn in FIG. 9(*a*), FIG. 9(*b*), and FIG. 9(*c*) shows the water repellent surface 105. The water-repellent treatment is performed on the upper surface of the substrate W, and, as a result, the hydrophobic liquid is allowed to enter the inside of the trench 102, and, on the other hand, the hydrophilic liquid whose hydrophilicity is higher than the hydrophobic liquid is limited in entering the inside of the trench 102.

Therefore, the upper surface of the substrate W is brought into a water repellent state by use of the water repellent agent-containing liquid, and then the hydrophobic liquid is supplied to the upper surface of the substrate W, hence making it possible to replace the water repellent agent-containing liquid on the upper surface of the substrate W with the hydrophobic liquid in the hydrophobic liquid replacement step. In that case, the water repellent agent-containing liquid within the trench 102, in addition to the water repellent agent-containing liquid outside the trench 102, is also replaced with the hydrophobic liquid. Hence, the hydrophobic liquid enters the inside of the trench 102, and the trench 102 is filled with the hydrophobic liquid as shown in FIG. 9(*a*) (hydrophobic liquid filling process).

Thereafter, the hydrophilic liquid is supplied to the upper surface of the substrate W in the hydrophilic liquid replacement step, and, as a result, the hydrophilic liquid enters the inside of the trench 102 while the hydrophobic liquid within the trench 102 are mixing with the hydrophilic liquid (hydrophilic liquid entry step). The ratio of the hydrophilic liquid contained in a liquid (hereinafter, referred to also as an "internal liquid 106") within the trench 102 gradually increases.

When the ratio of the hydrophilic liquid contained in the internal liquid 106 increases, the hydrophilicity of the internal liquid is raised, and the internal liquid 106 receives a repulsive force from a portion, which defines the trench 102, of the upper surface of the substrate W. Hence, the internal liquid 106 flows and recedes from the inside of the trench 102 as shown in FIG. 9(*b*) (internal liquid receding step). The internal liquid 106 is completely excluded from the inside of the trench 102 after all by the repulsive force received from the portion, which defines the trench 102, of the upper surface as shown in FIG. 9(*c*). The retreat of the internal liquid 106 from the trench 102 may be completed during the hydrophilic liquid replacement step (step S8), or may be completed during the drying step (step S9).

Therefore, it is possible to remove the internal liquid 106 from the trench 102 without proactively evaporating the internal liquid 106, and it is possible to suppress the generation of impurities in the trench 102 due to the evaporation of the liquid. As a result, it is possible to reduce impurities remaining in the trench 102.

For example, in a deep trench that exists around a color filter portion of an image sensor, an extremely small amount of metal is known to cause picture element defects, and, in a major surface of a substrate in which a deep trench is formed, a metal contamination level of $1\times10^8$ molecule/cm$^2$ or less is required. Unlike the first embodiment, there is a concern that a metal contamination of $1\times10^9$ to $1\times10^{10}$ molecule/cm$^2$ will occur in a drying method in which IPA, supercritical $CO_2$, or the like on the substrate W is vaporized by heating or decompressing.

According to the first embodiment, it is possible to remove the internal liquid 106 from the inside of the trench 102 without proactively evaporating the internal liquid 106 as described above. Therefore, it is possible to sufficiently suppress the metal contamination in the same way in a case in which the trench 102 is the deep trench existing around the color filter portion of the image sensor.

In the drying step, a gas is sprayed onto the liquid film 110 on the upper surface of the substrate W. That is, external stimulation is given to the liquid film 110 on the upper surface of the substrate W. The external stimulation is, for example, a physical force that promotes the flow of a hydrophilic liquid on the upper surface of the substrate W. The retreat of the internal liquid 106 from the inside of the trench 102 caused by the flow of the internal liquid 106 is promoted by the external stimulation given to the liquid film 110 by spraying the gas (first retreat promoting step). By promoting the retreat of the internal liquid 106, it is possible to suppress the generation of impurities inside the trench 102, which is due to the evaporation of a liquid. As a result, it is possible to reduce impurities remaining inside the trench 102.

In this substrate processing, the hydrophilic liquid replacement step and the drying step are performed without heating the liquid film 110 on the substrate W. Therefore, it is possible to suppress the evaporation of both the hydrophilic liquid and the hydrophobic liquid on the upper surface of the substrate W. Therefore, it is possible to suppress the generation of impurities on the upper surface of the substrate W, particularly inside the trench 102.

The hydrophilic liquid and the hydrophobic liquid are slightly evaporated even when the liquid film 110 is not heated. There is a case in which the internal liquid 106 inside the trench 102 is also evaporated. There is also a case in which a gas contained in a hydrophilic liquid reaches a state in which this gas can no longer be dissolved in this hydrophilic liquid, a gas is produced. For example, if the hydrophilic liquid is carbonated water, carbon dioxide will be produced. The gas produced in this way from the hydrophilic liquid inside the trench 102 is referred to as an evolved gas 107. The internal liquid 106 is pushed up by means of the evolved gas 107, and the flow of the internal liquid 106 is promoted, and the retreat of the internal liquid 106 from the trench 102 is promoted (second retreat promoting step).

According to this method, the use of the evolved gas 107 produced from the hydrophilic liquid makes it possible to push out the internal liquid 106 from the trench 102 more smoothly. Therefore, it is possible to suppress the generation of impurities inside the trench 102, which is due to the evaporation of a liquid. As a result, it is possible to reduce impurities remaining inside the trench 102.

If a water repellent agent-containing liquid that contains FDTS is used as the water repellent agent-containing liquid, it is particularly easy to perform a water-repellent treatment that changes the contact angle of pure water with respect to the flat surface to 90° or greater to the major surface of the substrate W. Therefore, it is easy to change the contact angle of pure water with respect to the major surface of the substrate W to 90° or greater.

Figure 10:
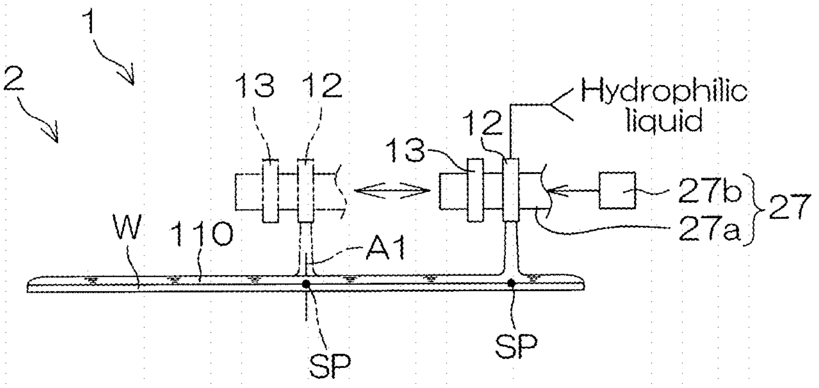
FIG. 10 is a schematic view shown to describe a modification of the substrate processing.

In the hydrophilic liquid replacement step (step S8), a supply position SP of the hydrophilic liquid in the upper surface of the substrate W may be moved by moving the hydrophilic liquid nozzle 12 in the horizontal direction as shown in FIG. 10. External stimulation given to the liquid film 110 on the upper surface of the substrate W by moving the supply position SP promotes the flow of the hydrophilic liquid. That is, the retreat of the internal liquid 106 from the inside of the trench 102, which is caused by a liquid flow, is promoted by means of the external stimulation given to the liquid film 110 by moving the supply position SP as shown in FIGS. 9(*a*) to 9(*c*) (first retreat promoting step).

Modification of Substrate Processing Apparatus

Figure 11:
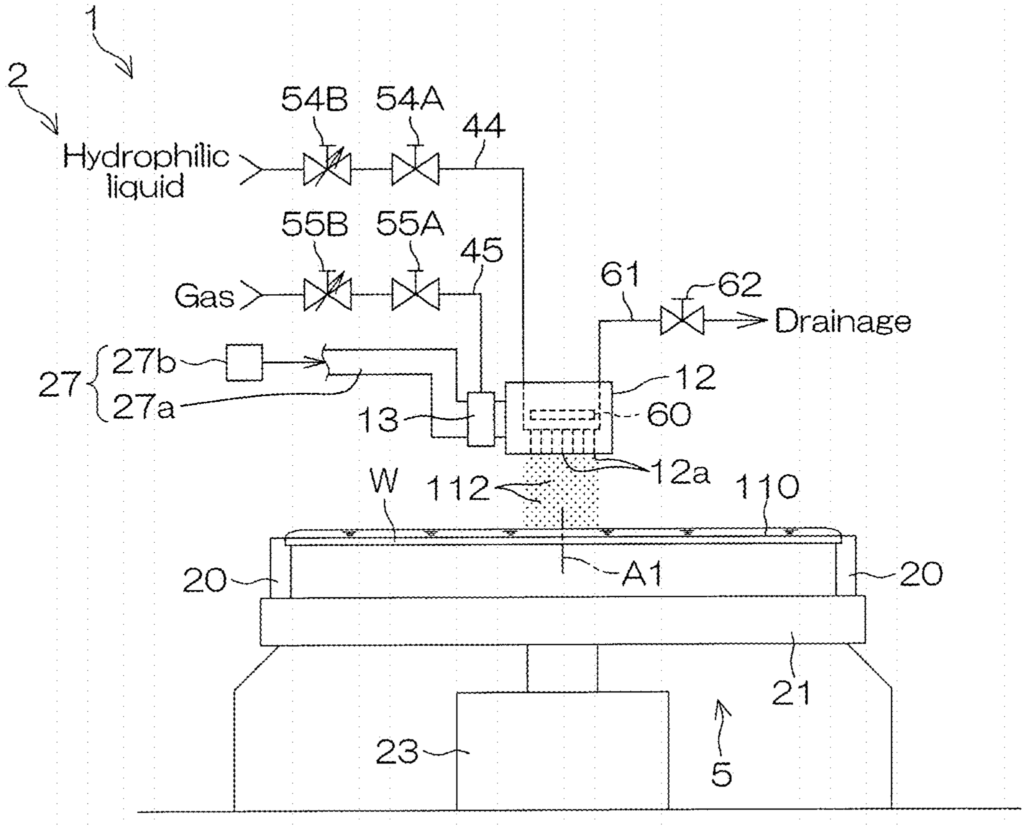
FIG. 11 is a schematic view shown to describe a first modification of the substrate processing apparatus.

FIG. 11 is a schematic view shown to describe a first modification of the substrate processing apparatus 1.

The hydrophilic liquid nozzle 12 is a spray nozzle that sprays a plurality of liquid droplets 112 of a hydrophilic liquid as shown in FIG. 11. The hydrophilic liquid nozzle 12 of this embodiment has a plurality of spray openings 12*a*, and sprays a plurality of liquid droplets of a hydrophilic liquid from each of the spray openings 12*a* by applying a voltage. The hydrophilic liquid nozzle 12 sprays the liquid droplets toward the upper surface of the substrate W, hence making it possible to give a physical force to the hydrophilic liquid while replacing the hydrophobic liquid on the upper surface of the substrate W with the hydrophilic liquid.

In the first modification, the external stimulation given to the liquid film 110 on the upper surface of the substrate W by supplying the hydrophilic liquid that is in a droplet state promotes the flow of the hydrophilic liquid. That is, the retreat of the internal liquid 106 from the inside of the trench 102, which is caused by the flow of the internal liquid 106, is promoted by the external stimulation given to the liquid film 110 by supplying the liquid droplet 112 as shown in FIGS. 9(*a*) to 9(*c*) (first retreat promoting step).

The hydrophilic liquid is always supplied to the hydrophilic liquid nozzle 12 under high pressure, and a piezoelectric element 60 that is vibrated by applying a voltage is built into the hydrophilic liquid nozzle 12. A hydrophilic liquid discharge piping 61, in addition to the hydrophilic liquid piping 44, is connected to the hydrophilic liquid nozzle 12. The liquid pressure in the hydrophilic liquid nozzle 12 is not sufficiently raised in a state in which a hydrophilic liquid discharge valve 62 provided in the hydrophilic liquid discharge piping 61 is opened, and therefore the hydrophilic liquid in the hydrophilic liquid nozzle 12 is discharged to the hydrophilic liquid discharge piping 61. On the other hand, it is possible to spray the liquid droplet 112 of the hydrophilic liquid from each of the spray openings 12*a* by closing the hydrophilic liquid discharge valve 62 and by vibrating the piezoelectric element 60.

The configuration of the hydrophilic liquid nozzle 12 serving as a spray nozzle is not limited to that shown in FIG. 11, and may be a two-fluid nozzle that forms a liquid droplet by mixing a hydrophilic liquid and a gas together inside the nozzle or outside the nozzle.

Figure 12A:
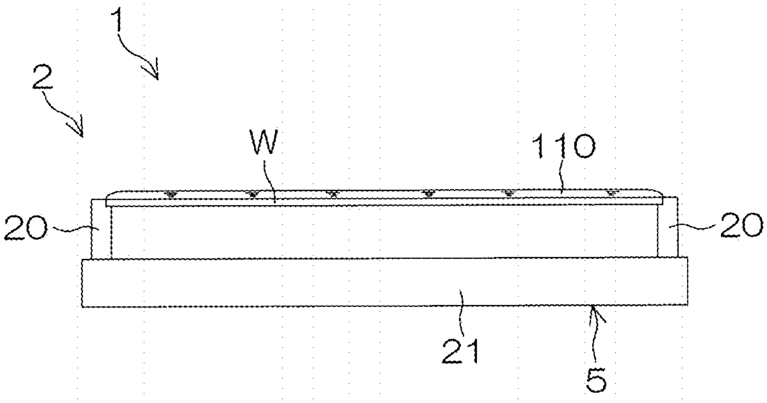
FIG. 12A is a schematic view shown to describe a second modification of the substrate processing apparatus.
Figure 12B:
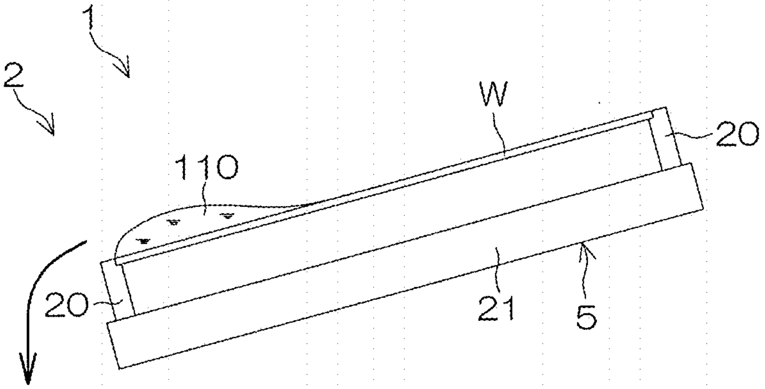
FIG. 12B is a schematic view shown to describe the second modification of the substrate processing apparatus.

FIG. 12A and FIG. 12B are schematic views shown to describe a second modification of the substrate processing apparatus 1. After the liquid film 110 is formed as shown in FIG. 12A, the hydrophilic liquid may be excluded from the upper surface of the substrate W by changing the posture of the substrate W while inclining the spin base 21 of the spin chuck 5 holding the substrate W in the drying step (step S9) as shown in FIG. 12B. External stimulation given to the liquid film 110 on the upper surface of the substrate W by a change in the posture of the substrate W promotes the flow of the internal liquid 106. That is, the retreat of the internal liquid 106 from the inside of the trench 102, which is caused by the flow of the internal liquid 106, is promoted by the external stimulation given to the liquid film 110 by a change in the posture of the substrate W as shown in FIGS. 9(*a*) to 9(*c*) (first retreat promoting step).

Figure 13A:
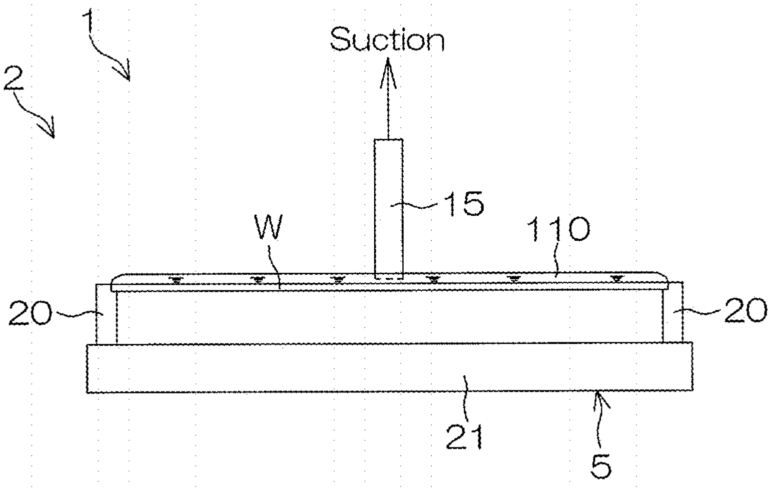
FIG. 13A is a schematic view shown to describe a third modification of the substrate processing apparatus.
Figure 13B:
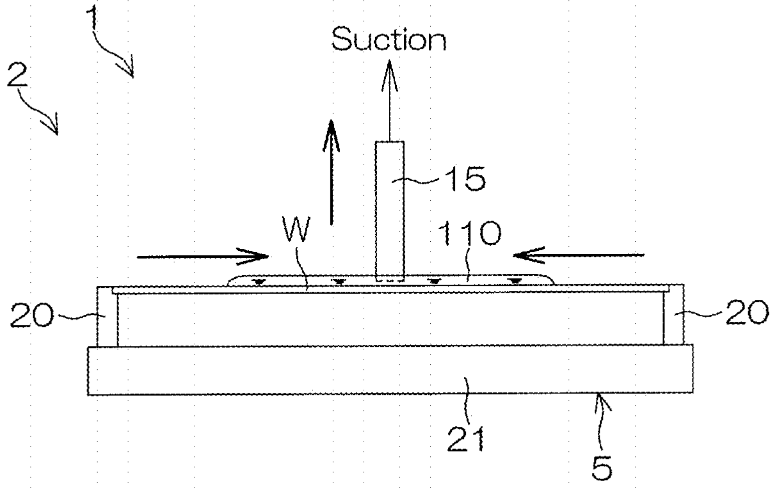
FIG. 13B is a schematic view shown to describe the third modification of the substrate processing apparatus.

FIG. 13A and FIG. 13B are schematic views shown to describe a third modification of the substrate processing apparatus 1. After the liquid film 110 is formed as shown in FIG. 13A, a suction nozzle 15 may be brought into contact with the liquid film 110, and then the hydrophilic liquid may be excluded from the upper surface of the substrate W by suctioning the liquid film 110 on the upper surface of the substrate W by means of the suction nozzle 15 in the drying step (step S9) as shown in FIG. 13B. External stimulation given to the liquid film 110 on the upper surface of the substrate W by suctioning the liquid film 110 by means of the suction nozzle 15 promotes the flow of the internal liquid 106. That is, the retreat of the internal liquid 106 from the inside of the trench 102, which is caused by the flow of the internal liquid 106, is promoted by the external stimulation given to the liquid film 110 by suction as shown in FIGS. 9(*a*) to 9(*c*) (first retreat promoting step).

Second Embodiment

Figure 14:
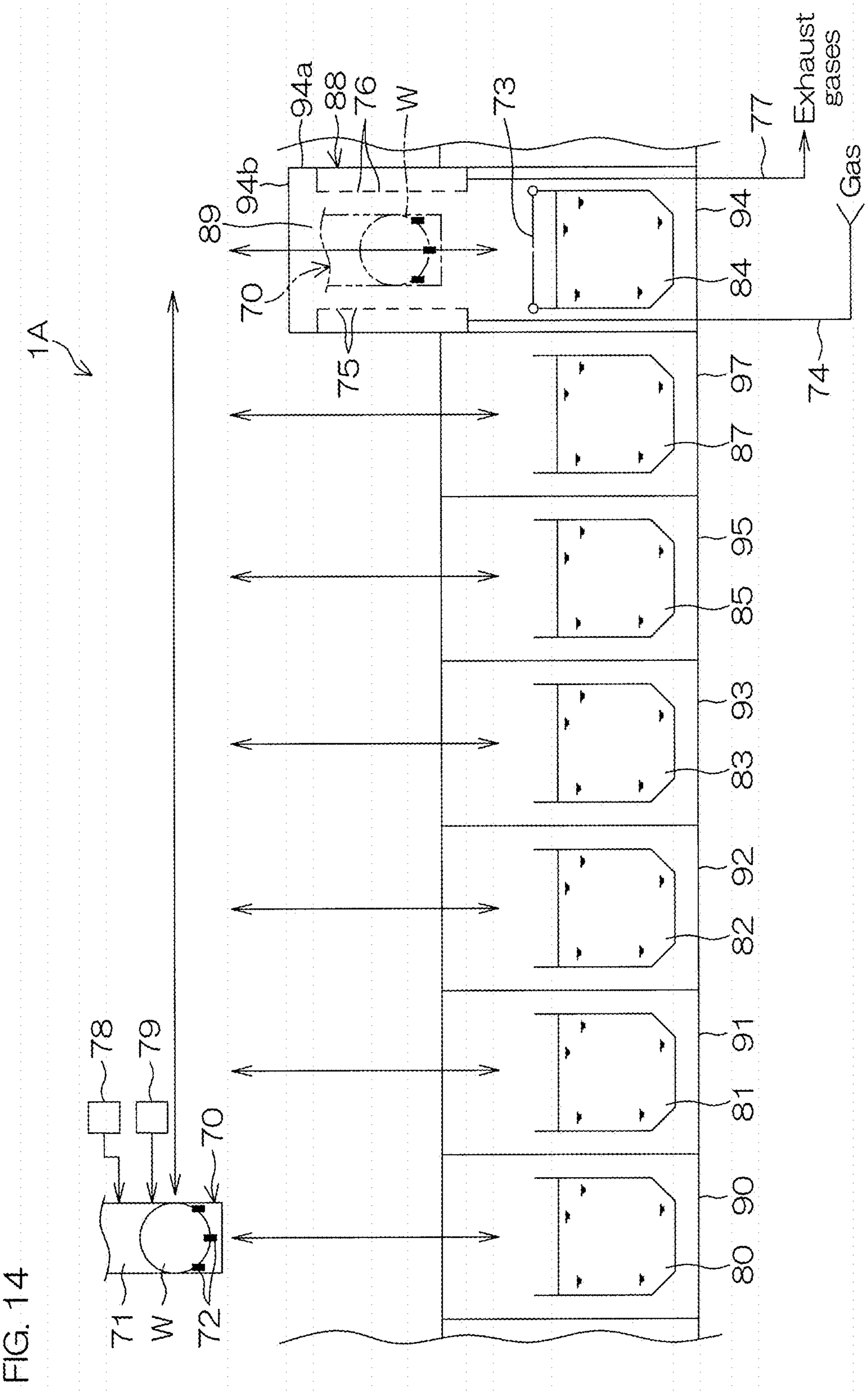
FIG. 14 is an illustrative elevational view of a substrate processing apparatus according to a second embodiment of the present invention.

FIG. 14 is an illustrative elevational view of a substrate processing apparatus 1A according to a second embodiment of the present invention. The substrate processing apparatus 1A according to the second embodiment differs from the substrate processing apparatus 1 according to the first embodiment, and is a batch type substrate processing apparatus that processes a plurality of substrates W collectively. In FIG. 14, the same reference sign as in FIG. 1 and in other drawings is assigned to a constituent equivalent to each constituent shown in FIG. 1 to FIG. 13B mentioned above, and a description of this constituent is omitted. The same applies to FIG. 15 described later.

The substrate processing apparatus 1A includes a lifter 70 that holds a plurality of substrates W in a predetermined processing posture, a first chemical liquid tank 80 that stores a chemical liquid, such as hydrofluoric acid, in which the substrates W are immersed, a first chemical liquid treatment chamber 90 that houses the first chemical liquid tank 80, a first rinse liquid tank 81 that stores a rinse liquid, such as DIW, in which the substrates W are immersed, and a first rinsing processing chamber 91 that houses the first rinse liquid tank 81.

The substrate processing apparatus 1A additionally includes a second chemical liquid tank 82 that stores a chemical liquid, such as an APM liquid, in which the substrates W are immersed, a second chemical liquid treatment chamber 92 that houses the second chemical liquid tank 82, a second rinse liquid tank 83 that stores a rinse liquid, such as DIW, in which the substrates W are immersed, and a second rinsing processing chamber 93 that houses the second rinse liquid tank 83.

The substrate processing apparatus 1A additionally includes a hydrophobic liquid tank 85 that stores a hydrophobic liquid, such as IPA, in which the substrates W are immersed, a hydrophobic liquid processing chamber 95 that houses the hydrophobic liquid tank 85, a water repellent agent-containing liquid tank 87 that stores a water repellent agent-containing liquid in which the substrates W are immersed, a water-repellent treatment chamber 97 that houses the water repellent agent-containing liquid tank 87, a hydrophilic liquid tank 84 that stores a hydrophilic liquid, such as carbonated water, in which the substrates W are immersed, and a hydrophilic liquid processing chamber 94 that houses the hydrophilic liquid tank 84.

The processing posture is, for example, the posture of the substrate W shown in FIG. 14, and is a vertical posture in which the major surface of the substrate W is a vertical plane. The lifter 70 includes a main body plate 71 extending in the vertical direction and a plurality of (in the example of FIG. 14, three) holding rods 72 that are supported by the main body plate 71 and that extend in the horizontal direction. The substrates W are supported by the holding rods 72 in a state of being horizontally arranged along the direction in which the holding rod 72 extends.

The lifter 70 is raised and lowered by a lifter raising/lowering mechanism 78, and is moved in the horizontal direction by a lifter sliding mechanism 79. The lifter raising/lowering mechanism 78 includes an actuator (not shown), such as an electric motor or an air cylinder. The lifter sliding mechanism 79 includes an actuator (not shown), such as an electric motor or an air cylinder.

The substrate processing apparatus 1A has a drying treatment chamber 88 that is disposed directly above the hydrophilic liquid tank 84 in the hydrophilic liquid processing chamber 94. The hydrophilic liquid tank 84 and the drying treatment room 88 are divided by a lid member 73 that opens and closes the hydrophilic liquid tank 84. The drying treatment chamber 88 includes a drying treatment space 89 divided by both a sidewall portion 94*a* and an upper wall portion 94*b* of the hydrophilic liquid processing chamber 94 and by the lid member 73. The upper wall portion 94*b* is openable and closable.

The drying treatment chamber 88 has a plurality of supply holes 75 that are opened in the sidewall portion 94*a* and that supply a gas, such as inert gas, supplied from a gas supply piping 74 to the drying treatment space 89 and a plurality of exhaust holes 76 that are opened in the sidewall portion 94*a* and that emit an atmosphere within the drying treatment space 89 to a gas discharge piping 77.

The lifter 70 is movable in the horizontal direction, and is movable to a position directly above each of the processing chambers. The lifter 70 is capable of lowering the substrates W from an upper position directly above each of the processing chambers and placing the substrates W inside a corresponding processing tank. Additionally, the lifter 70 moves upwardly and downwardly in the hydrophilic liquid processing chamber 94, and, as a result, is capable of placing the substrates W at a hydrophilic liquid processing position in the hydrophilic liquid tank 84 and at a gas treatment position (position shown by an alternate long and two short dashed line in FIG. 14) in the drying treatment space 89.

The substrates W are placed in a corresponding processing tank or in the drying treatment space 89 by means of the lifter 70, and, as a result, it is possible to perform the substrate processing shown in FIG. 5.

Specifically, first, the lifter 70 immerses the substrates W in a chemical liquid (first chemical liquid), such as hydrofluoric acid, in the first chemical liquid tank 80, and, as a result, a pair of major surfaces of each of the substrates W are processed by the first chemical liquid (first chemical liquid treatment step: Step S1 of FIG. 5). Next, the lifter 70 takes out the substrates W from the first chemical liquid tank 80, and immerses the substrates W in a rinse liquid, such as DIW, in the first rinse liquid tank 81. Hence, the pair of major surfaces of each of the substrates W are rinsed by the rinse liquid (first rinsing step of FIG. 5: Step S2). Next, the lifter 70 takes out the substrates W from the first rinse liquid tank 81, and immerses the substrates W in a chemical liquid (second chemical liquid), such as an APM liquid, in the second chemical liquid tank 82, and, as a result, the pair of major surfaces of each of the substrates W are processed by the second chemical liquid (second chemical liquid treatment step: Step S3 of FIG. 5). Next, the lifter 70 takes out the substrates W from the second chemical liquid tank 82, and immerses the substrates W in a rinse liquid, such as DIW, in the second rinse liquid tank 83. Hence, the pair of major surfaces of each of the substrates W are rinsed by the rinse liquid (second rinsing step: Step S4 of FIG. 5).

Next, the lifter 70 takes out the substrates W from the second rinse liquid tank 83, and immerses the substrates W in a hydrophobic liquid (organic solvent), such as IPA, in the hydrophobic liquid tank 85. Hence, the rinse liquid on the pair of major surfaces of each of the substrates W is replaced with the organic solvent (organic solvent replacement step: step S5 of FIG. 5). Next, the lifter 70 takes out the substrates W from the hydrophobic liquid tank 85, and immerses the substrates W in a water repellent agent-containing liquid in the water repellent agent-containing liquid tank 87. Hence, a water-repellent treatment is performed on the pair of major surfaces of each of the substrates W (water-repellent treatment step: step S6 of FIG. 5).

Next, the lifter 70 takes out the substrates W from the water repellent agent-containing liquid tank 87, and immerses the substrates W in a hydrophobic liquid, such as IPA, in the water repellent agent-containing liquid tank 87. Hence, the water repellent agent-containing liquid on the pair of major surfaces of each of the substrates W is replaced with the hydrophobic liquid (hydrophobic liquid replacement step: step S7 of FIG. 5). Next, the lifter 70 takes out the substrates W from the hydrophobic liquid tank 85, and immerses the substrates W in a hydrophilic liquid in the hydrophilic liquid tank 84. Hence, the hydrophobic liquid on the pair of major surfaces of each of the substrates W is replaced with the hydrophilic liquid (hydrophilic liquid replacement step: step S8 of FIG. 5).

Next, the lifter 70 takes out the substrates W from the hydrophilic liquid tank 84, and places the substrates W in the drying treatment space 89. Hence, the hydrophilic liquid on the pair of major surfaces of the substrate W is removed from the substrate W by its own weight. A gas, such as inert gas, is supplied from the supply holes 75 to the drying treatment space 89. Hence, the removal of the hydrophilic liquid from the pair of major surfaces of the substrate W is promoted. External stimulation given to the liquid film 110 by spraying the gas promotes the flow of the hydrophilic liquid on the pair of major surfaces of each of the substrates W. Therefore, the retreat of the internal liquid 106 from the inside of the trench 102, which is caused by the flow of the internal liquid 106, is promoted by the external stimulation given to the hydrophilic liquid on the major surface of the substrate W by spraying the gas as shown in FIGS. 9(*a*) to 9(*c*) (first retreat promoting step).

In the second embodiment as well, the hydrophilic liquid replacement step (step S8) and the drying step (step S9) are performed in the same way without heating the liquid on the substrate W. Additionally, the internal liquid 106 is pushed up by the evolved gas 107, and the flow of the internal liquid 106 is promoted, and the retreat of the internal liquid from the trench 102 is promoted as shown in FIG. 9(*b*) (second retreat promoting step). According to the second embodiment, the same effect as in the first embodiment is fulfilled.

Figure 15:
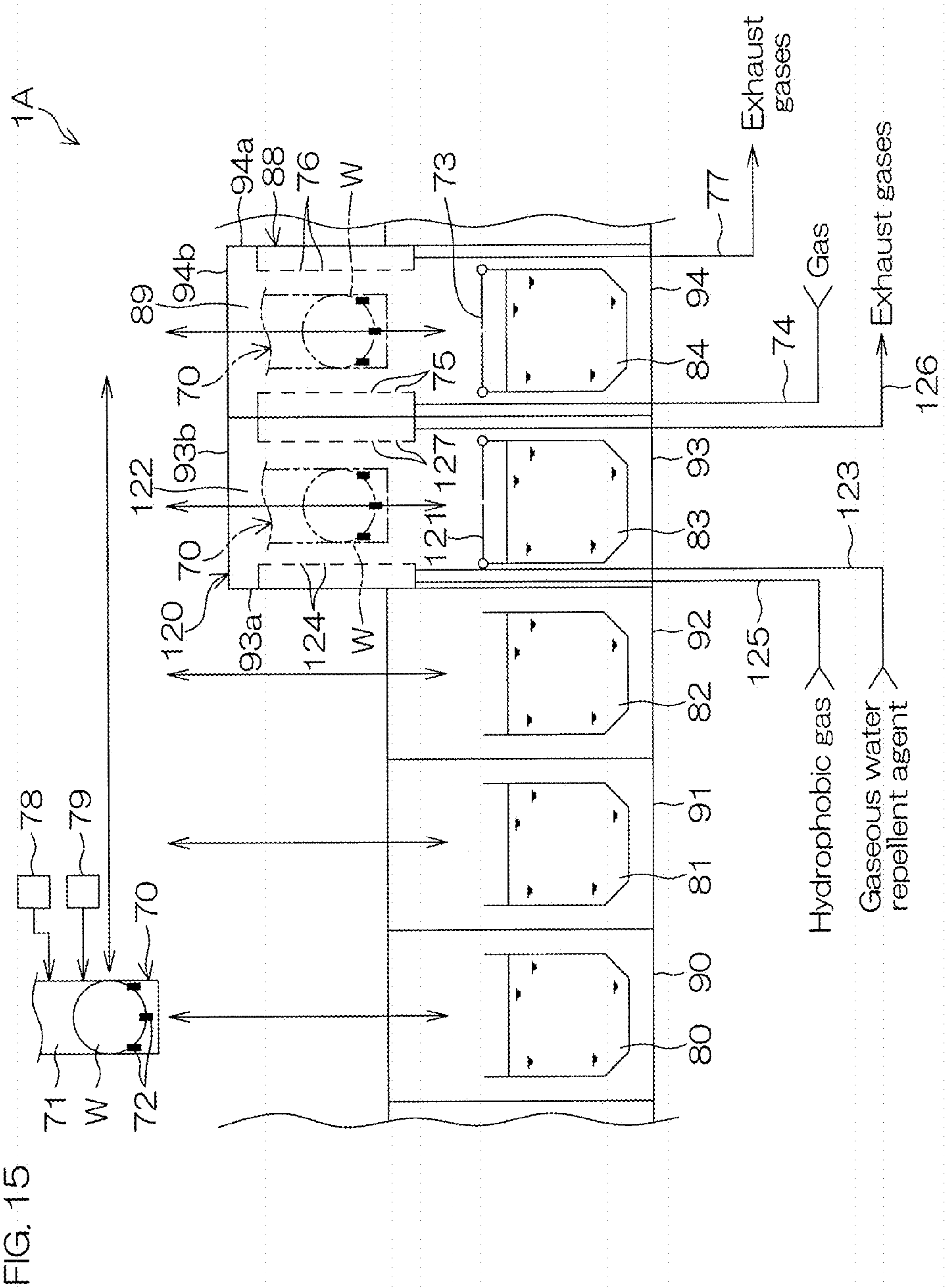
FIG. 15 is an illustrative elevational view of a substrate processing apparatus according to a modification of the second embodiment.

Modification of Substrate Processing Apparatus According to Second Embodiment In the substrate processing apparatus 1A according to the modification of the second embodiment shown in FIG. 15, the hydrophobic liquid tank 85 and the water repellent agent-containing liquid tank 87 are not provided. In the substrate processing apparatus 1A according to the modification of the second embodiment, a hydrophobic gas is supplied toward the substrates W, and a hydrophobic liquid is allowed to adhere to the pair of major surfaces of each of the substrates W by means of a dew condensation, and, as a result, the hydrophobic liquid is supplied. Additionally, a water repellent agent-containing gas is supplied toward the substrates W, and a water repellent agent-containing liquid is allowed to adhere to the pair of major surfaces of each of the substrates W by means of a dew condensation, and, as a result, the water repellent agent-containing liquid is supplied.

The hydrophobic gas is, for example, steam of a hydrophobic liquid, and is an organic gas. The water repellent agent-containing gas is, for example, steam of a water repellent agent. The hydrophobic gas may be a mixed gas of both the steam of a hydrophobic liquid and an inert gas. Likewise, the water repellent agent-containing gas may be a mixed liquid of both a water repellent agent-containing gas and an inert gas.

The substrate processing apparatus 1A according to the modification shown in FIG. 15 has a water-repellent treatment chamber 120 that is placed directly above the second rinse liquid tank 83 in the second rinsing processing chamber 93.

The second rinse liquid tank 83 and the water-repellent treatment chamber 120 are divided by a lid member 121 that opens and closes the second rinse liquid tank 83. The water-repellent treatment chamber 120 includes a water-repellent treatment space 122 divided by both a sidewall portion 93*a* and an upper wall portion 93*b* of the second rinsing processing chamber 93 and by the lid member 121. The upper wall portion 93*b* is openable and closable.

The water-repellent treatment chamber 120 has a plurality of supply holes 124 that are opened in the sidewall portion 93*a* and that supply a water repellent agent-containing gas supplied from a water repellent agent-containing gas supply piping 123 and a hydrophobic gas (organic gas), such as IPA, supplied from a hydrophobic gas supply piping 125 to the water-repellent treatment space 122 and a plurality of exhaust holes 127 that are opened in the sidewall portion 93*a* and that emit an atmosphere in the water-repellent treatment space 122 to an exhaust piping 126.

When substrate processing is performed by use of the substrate processing apparatus 1A according to the modification shown in FIG. 15, the organic solvent replacement step (step S5 of FIG. 5), the water-repellent treatment step (step S6 of FIG. 5), and the hydrophobic liquid replacement step (step S7 of FIG. 5) are performed in a state in which the lifter 70 has placed the substrates W in the water-repellent treatment space 122.

In detail, in the organic solvent replacement step (step S5), a hydrophobic gas (organic gas) is supplied toward the substrates W, and a hydrophobic liquid is allowed to adhere to the pair of major surfaces of each of the substrates W, and, as a result, the rinse liquid is replaced with the hydrophobic liquid (organic solvent).

In the water-repellent treatment step (step S6), a water repellent agent-containing gas is supplied toward the substrates W, and a water repellent agent-containing liquid is allowed to adhere to the pair of major surfaces of each of the substrates W, and, as a result, the hydrophobic liquid (organic solvent) is replaced with the water repellent agent-containing liquid. Hence, a water-repellent treatment is performed on the pair of major surfaces of each of the substrates W.

In the hydrophobic liquid replacement step (step S7), a hydrophobic gas is supplied toward the substrates W, and a hydrophobic liquid is allowed to adhere to the pair of major surfaces of each of the substrates W, and, as a result, the water repellent agent-containing liquid is replaced with the hydrophobic liquid.

Other Embodiments

This invention is not limited to the embodiments described above, and can be carried out in yet other modes.

(1) For example, in the first embodiment, substrate processing is performed on the upper surface of the substrate W. However, substrate processing may be performed on a lower surface of the substrate W.

(2) In the first embodiment, the spin chuck 5 is a gripping type spin chuck that grips the peripheral edge of the substrate W by means of the chuck pins 20, and yet the spin chuck 5 is not limited to the gripping type spin chuck. For example, the spin chuck 5 may be a vacuum suction type spin chuck that allows the spin base 21 to suction the substrate W.

(3) The spin chuck 5 is not necessarily required to horizontally hold the substrate W. That is, the spin chuck 5 may vertically hold the substrate W unlike FIG. 3, and may hold the substrate W so that the upper surface of the substrate W is inclined with respect to a horizontal surface.

(4) A hydrophobic liquid is supplied to the major surface of the substrate W by supplying a hydrophobic gas toward the major surface of the substrate W in the second embodiment. However, in the first embodiment as well, the hydrophobic liquid may be supplied to the upper surface of the substrate W by supplying the hydrophobic gas into the chamber 4, or the hydrophobic liquid may be supplied to the upper surface of the substrate W by supplying the hydrophobic gas to a space between the facing surface 6*a* of the facing member 6 and the upper surface of the substrate W. The same applies to a water repellent agent-containing liquid. That is, in the first embodiment, the water repellent agent-containing liquid may be supplied to the upper surface of the substrate W by supplying the water repellent agent-containing liquid into the chamber 4, or the water repellent agent-containing liquid may be supplied to the upper surface of the substrate W by supplying the water repellent agent-containing gas to a space between the facing surface 6*a* of the facing member 6 and the upper surface of the substrate W.

(5) In each of the embodiments mentioned above, a plurality of fluids are configured to be discharged from a plurality of nozzles, respectively. However, the manner of the discharge of each of the fluids is not limited to each of the embodiments mentioned above.

For example, a fluid may be discharged from a fixed nozzle whose position is fixed in the chamber 4, and all fluids may be configured to be discharged from a single nozzle toward the upper surface of the substrate W. Additionally, each of the fluid nozzles may be configured to be movable individually, and all fluids may be configured to be discharged from the central nozzle 14. Additionally, all fluid nozzles may be configured to be moved together by means of a single nozzle moving mechanism.

(6) In each of the embodiments mentioned above, a portion of the members including the piping, the pump, the valve, the actuator, etc., is not shown, and yet this does not mean that these members do not exist, and these members are actually provided at appropriate positions, respectively. For example, a flow rate regulating valve (not shown) that regulates the flow rate of a processing liquid discharged from a corresponding processing liquid nozzle may be interposed in each piping.

(7) In each of the embodiments mentioned above, the controller 3 controls the entirety of the substrate processing apparatus 1. However, the controller that controls each member of the substrate processing apparatus 1 may be dispersed at a plurality of places. Additionally, the controller 3 is not required to directly control each member, and a signal outputted from the controller 3 may be received by a slave controller that controls each member of the substrate processing apparatus 1.

(8) Additionally, in the embodiments mentioned above, the substrate processing apparatus 1 includes the transfer robots IR and CR, the processing units 2, and the controller 3. However, the substrate processing apparatus 1 is composed of the single processing unit 2 and the controller 3, and is not required to include a transfer robot. Alternatively, the substrate processing apparatus 1 may consist of only the single processing unit 2. In other words, the processing unit 2 may be an example of the substrate processing apparatus.

(9) Preferably, the hydrophilic liquid replacement step and the drying step are performed without heating a liquid on the substrate W, and heating to such a degree that the internal liquid 106 does not proactively evaporate is allowable.

The embodiments of the present invention are described in detail above, however, these are just detailed examples used for clarifying the technical contents of the present invention, and the present invention should not be limitedly interpreted to these detailed examples, and the scope of the present invention should be limited only by the claims appended hereto.

REFERENCE SIGNS LIST

100: pattern
102: trench (concave portion)
106: internal liquid
107: evolved gas
110: liquid film 111 opening
200: flat view
w: substrate
θ: contact angle

The invention claimed is:

1. A substrate processing method to process a substrate having a major surface at which a pattern having a concave portion is formed, the substrate processing method comprising:

performing a water-repellent treatment on the major surface of the substrate to supply a water repellent agent-containing liquid to the major surface of the substrate and to change a contact angle of pure water with respect to a flat surface to 90° or greater;

after performing the water-repellent treatment on the major surface of the substrate, supplying a hydrophobic liquid to the major surface of the substrate and replacing the water repellent agent-containing liquid on the major surface of the substrate with the hydrophobic liquid;

after supplying the hydrophobic liquid to the major surface of the substrate, supplying a hydrophilic liquid that is mixable with the hydrophobic liquid and that has hydrophilicity higher than the hydrophobic liquid to the major surface of the substrate and replacing the hydrophobic liquid on the major surface of the substrate with the hydrophilic liquid to form a liquid film of the hydrophilic liquid on the major surface of the substrate; and forming an opening that exposes the major surface in the liquid film by supplying a gas toward the liquid film and excluding the hydrophilic liquid from the major surface of the substrate by enlarging the opening;

wherein, replacing the water repellent agent-containing liquid on the major surface of the substrate with the hydrophobic liquid includes filling the hydrophobic liquid into the concave portion of the pattern, replacing the hydrophobic liquid on the major surface of the substrate with the hydrophilic liquid includes:

allowing the hydrophilic liquid to enter the concave portion while the hydrophilic liquid is mixed with the hydrophobic liquid in the concave portion by allowing the hydrophilic liquid to be supplied to the major surface of the substrate; and causing an internal liquid to recede from the concave portion by causing the internal liquid, which is a liquid in the concave portion, to flow;

the substrate processing method further comprises promoting a retreat of the internal liquid from an inside of the concave portion, which is caused by a flow of the internal liquid, by giving external stimulation to the hydrophilic liquid on the major surface of the substrate, and the external stimulation is selected from the group consisting of (a), (b), and (c):

(a) supplying the hydrophilic liquid that is in a droplet state;

(b) changing a posture of the substrate; and (c) suctioning the liquid film by a suction nozzle.

2. The substrate processing method according to claim 1, wherein performing the water-repellent treatment on the major surface of the substrate and excluding the hydrophilic liquid from the major surface of the substrate are performed without heating liquids on the major surface of the substrate.

3. The substrate processing method according to claim 1, further comprising promoting the retreat of the internal liquid from the inside of the concave portion, which is caused by the flow of the internal liquid, by replacing the internal liquid with an evolved gas generated from the hydrophilic liquid.

4. The substrate processing method according to claim 1, wherein the water repellent agent-containing liquid contains 1H, 1H,2H,2H-perfluoro decyltriethoxysilane.

* * * * *